United States Patent
Sakamoto et al.

(10) Patent No.: US 9,244,210 B2
(45) Date of Patent: Jan. 26, 2016

(54) LIGHT GUIDE PLATE, DISPLAY UNIT INCLUDING THE LIGHT GUIDE PLATE, TRAFFIC SIGN INCLUDING THE DISPLAY UNIT, AND METHOD OF MANUFACTURING THE LIGHT GUIDE PLATE AND METHOD OF MANUFACTURING THE TRAFFIC SIGN

(75) Inventors: Mitsuhide Sakamoto, Aichi (JP); Junichi Ando, Aichi (JP)

(73) Assignee: S.K.G. CO., LTD., Aichi (JP)

( * ) Notice: Subject to any disclaimer, the term of this patent is extended or adjusted under 35 U.S.C. 154(b) by 257 days.

(21) Appl. No.: 13/979,206

(22) PCT Filed: Jul. 24, 2012

(86) PCT No.: PCT/JP2012/068667
§ 371 (c)(1),
(2), (4) Date: Jul. 11, 2013

(87) PCT Pub. No.: WO2013/132671
PCT Pub. Date: Sep. 12, 2013

(65) Prior Publication Data
US 2014/0369068 A1    Dec. 18, 2014

(30) Foreign Application Priority Data

Mar. 5, 2012   (JP) .................................. 2012-48580

(51) Int. Cl.
*G09F 13/18*  (2006.01)
*F21V 8/00*   (2006.01)
(Continued)

(52) U.S. Cl.
CPC ................ *G02B 6/0025* (2013.01); *F21K 9/52* (2013.01); *F21K 9/90* (2013.01); *G02B 6/0031* (2013.01);
(Continued)

(58) Field of Classification Search
CPC . G02F 1/1335; G02F 1/133504; G02B 6/002; G02B 6/0016; G02B 6/0028; G02B 6/0031; G02B 6/0073; G02B 6/0066; G09F 2013/184

USPC .......................... 362/615, 628; 349/58, 61–65
See application file for complete search history.

(56) References Cited

U.S. PATENT DOCUMENTS 5,619,351 A     4/1997  Funamoto et al.
5,999,238 A  *  12/1999 Ihara ............................... 349/58
(Continued)

FOREIGN PATENT DOCUMENTS

JP      07-159621      6/1995
JP      11-142842      5/1999
(Continued)

OTHER PUBLICATIONS

U.S. Appl. No. 14/009,889 to Mitsuhide Sakamoto et al., which was filed Oct. 4, 2013.

(Continued)

*Primary Examiner* — Karabi Guharay
(74) *Attorney, Agent, or Firm* — Greenblum & Bernstein, P.L.C.

(57) ABSTRACT

Even though no light source is provided in the vicinity of each curved apex of a main face, the brightness difference depending on the location on the main face is reduced, and a light guide plate that contributes to electric power saving can be provided. A display and a traffic sign including the display that can keep a small brightness difference depending on the location on the main face, and reduce the power consumption. The ratio of the area of the first diffusion dots and second diffusion dots within the second diffusion region is greater than the ratio of the area of the first diffusion dots within the first diffusion region. Even though no light source unit is provided at a curved section, the brightness difference (the unevenness of brightness) depending on the location on the entire main face is reduced, and electric power saving can be achieved.

15 Claims, 21 Drawing Sheets

(51) Int. Cl.
*F21K 99/00* (2010.01)
*G09F 13/04* (2006.01)
*F21Y 101/02* (2006.01)

(52) U.S. Cl.
CPC ............ *G02B 6/0036* (2013.01); *G02B 6/0058* (2013.01); *G02B 6/0073* (2013.01); *G09F 13/18* (2013.01); *F21Y 2101/02* (2013.01); *G02B 6/0038* (2013.01); *G09F 2013/049* (2013.01); *G09F 2013/0472* (2013.01); *G09F 2013/184* (2013.01); *Y10T 29/49117* (2015.01)

(56) References Cited

U.S. PATENT DOCUMENTS

| | | | |
|---|---|---|---|
| 2002/0030650 A1 | 3/2002 | KKawada et al. | |
| 2004/0184257 A1* | 9/2004 | Huang | 362/31 |
| 2006/0227261 A1* | 10/2006 | Shu | 349/65 |
| 2007/0242475 A1 | 10/2007 | Minobe et al. | |
| 2009/0109060 A1* | 4/2009 | Liu et al. | 340/907 |
| 2010/0180479 A1* | 7/2010 | Inaba et al. | 40/546 |

FOREIGN PATENT DOCUMENTS

| | | |
|---|---|---|
| JP | 2000-082314 | 3/2000 |
| JP | 2002-107716 | 4/2002 |
| JP | 2003-331628 | 11/2003 |
| JP | 2004-192911 | 7/2004 |
| JP | 2005-243601 | 9/2005 |
| JP | 2005-352400 | 12/2005 |
| JP | 2008-147040 | 6/2008 |
| JP | 2010-251050 | 11/2010 |
| JP | 2011-158672 | 8/2011 |

OTHER PUBLICATIONS

International Search Report issued Oct. 30, 2012 in PCT/JP2012/068667.

* cited by examiner (A)

(B)

(C)

(A)

(B)

(A)

α

(B)

β

(C)

γ

(B)

(A)

(A)

(B)

(A)

(B)

LIGHT GUIDE PLATE, DISPLAY UNIT INCLUDING THE LIGHT GUIDE PLATE, TRAFFIC SIGN INCLUDING THE DISPLAY UNIT, AND METHOD OF MANUFACTURING THE LIGHT GUIDE PLATE AND METHOD OF MANUFACTURING THE TRAFFIC SIGN

TECHNICAL FIELD

The present invention relates to a light guide plate, a display unit including the light guide plate, a traffic sign including the display unit, and a method of manufacturing the light guide plate and a method of manufacturing the traffic sign.

BACKGROUND ART

Conventionally, as a method of lighting the main face of a light guide plate having a round shape or polygon (for example, pentagon) shape, it is known a method of providing LEDs at the entire side face of the light guide plate. For example, when a light guide plate has a main face having a round shape, as shown in FIG. 18 it is known a light device or display, wherein: a C-shaped steel having a light source having a plurality of LEDs on the inside face thereof is provided on the side face of the light guide plate; the light of the LEDs are emitted from the side face of the light guide plate; when the light enters into the light guide plate, the light diffuses by diffusion dots provided on the main face of the light guide plate. However, in this method, in which the LEDs are placed over a wide range of the side face of the light guide plate, there are problems that a great number of LEDs are required, and that large power consumption is required.

As a method of reducing the power consumption of LEDs, it can be thought of, for example, reducing the number of LEDs provided at the side face. Particularly, when the light guide plate is polygonal (for example, pentagonal), it can be thought of a method where no light source is provided in the vicinity of each curved apex while a light source is only provided at the side face of each linear side. In this case, as compared with the case where the light source is provided on the entire side face, the number of provided LEDs is reduced, which reduces the power consumption, and also as no LED is placed on the curved portion of the main face, the labor for placing LEDs can be saved. However, since no LED is placed in the vicinity of each apex, there is a problem that a region in the vicinity of each apex becomes darker than other regions, and the unevenness of brightness occurs, and the brightness of the entire main face cannot be uniform.

For such problems, for example, Patent Document 1 discloses a light device having a light guide plate, in which prisms are formed on the entire side face of the LED-provided side face of the light guide plate, and thereby light is diffused between LEDs, which allows the brightness of the entire main face to be uniform.

Patent Document 1: JP-A-2003-331628

SUMMARY OF INVENTION

Problems to be Solved by the Invention

However, in such a light guide plate, there are problems that each prism is required to be positioned at a corresponding LED with a high degree of accuracy, and also, as a certain distance is required between each prism and a corresponding LED to use the prism effectively, light entering into the light guide plate is reduced, and the entire light guide plate is darkened.

The present invention has been developed in view of such problems. The main object of the present invention is to provide a light guide plate capable of reducing the difference of the brightness depending on a region of the main face even when no light source is provided in the vicinity of each apex of the main face, and capable of contributing to power saving. In addition, another object is to provide a display unit and a traffic sign including the display having the light guide plate, the difference of the brightness depending on a region of the main face is kept small without providing a light source in the vicinity of each curved apex of the main face, while reducing power consumption.

Solutions to the Problems

In order to achieve at least one of the above objects, the present invention adopts the following means.

The light guide plate of the present invention is:

a light guide plate for guiding light entered from a side face thereof, toward a main face thereof, wherein the main face has a first diffusion region and a second diffusion region, and has a shape surrounded by at least three linear sections, and curved sections each interconnecting adjacent linear sections, the first diffusion region is a region having a plurality of first diffusion elements for diffusing the light entered from the side face, towards the main face, the second diffusion region is a region located between the first diffusion region and the corresponding curved section, and has a plurality of second diffusion elements for diffusing the light entered from the side face, towards the main face, and the ratio of the area of the plurality of first diffusion elements within the first diffusion region is smaller than the ratio of the area of the plurality of second diffusion elements within the second diffusion region.

This light guide plate has the second diffusion region between the first diffusion region and the corresponding curved section, the ratio of the area of the plurality of first diffusion elements within the first diffusion region is smaller than the ratio of the area of the plurality of second diffusion elements within the second diffusion region. In other words, the density of the second diffusion elements in the second diffusion region is greater than the density of the first diffusion elements in the first diffusion region. Therefore, when the light uniformly enters into the entire side face, the second diffusion region becomes brighter than the first diffusion region. In this manner, even though when no light source is placed at the curved section, light entered from the side face reduces as it gets closer to the curved section, the unevenness of brightness between the first diffusion region and the second diffusion region can be reduced by making the ratio of the area of the plurality of second diffusion elements within the second diffusion region greater than the ratio of the area of the plurality of first diffusion elements within the first diffusion region. In other words, the brightness difference across the entire main face can be reduced.

In a light guide plate of the present invention, the first diffusion elements and the second diffusion elements may be diffusion dots. In this manner, the first diffusion elements and the second diffusion elements can be formed in similar methods, and therefore, as compared with a case that the second diffusion elements are formed in a different method from that for the first diffusion elements, the labor of forming the second diffusion elements can be further reduced. In this case, providing more diffusion dots in the second diffusion region than those in the first diffusion region allows the second diffusion region to become brighter than the first diffusion region when light uniformly enters from the entire side face. In this manner, even though when no light source is provided at the curved section, light entered from the side face reduces as it gets closer to the curved section, the brightness difference between the first diffusion region and the second diffusion region can be reduced by increasing the ratio of the area of the second diffusion elements within the second diffusion region. In other words, the unevenness of brightness across the entire main face can be reduced.

In a light guide plate of the present invention, the first diffusion elements are diffusion dots, and the second diffusion elements may be diffusion dots and first diffusion ditches. In this case, the ratio of the area of the diffusion dots and the first diffusion ditches within the second diffusion region becomes greater than the ratio of the area of the diffusion dots within the first diffusion region, and when the light enters from the entire side face, the second diffusion region becomes brighter than the first diffusion region when light uniformly enters from the entire side face. In this manner, even though when no light source is provided at the curved section, light entered from the side face reduces as it gets closer to the curved section, the unevenness of brightness between the first diffusion region and the second diffusion region can be reduced by increasing the ratio of the area of the second diffusion elements within the second diffusion region. In other words, the unevenness of brightness across the entire main face can be reduced.

In the light guide plate of this embodiment of the present invention, each first diffusion ditch may be provided as a continuous dotted line, or the first diffusion ditches are formed radially from a curved section side. In this case, the ratio of the area of the first diffusion ditches increases as it gets close to the curved section side, and thus, when the light enters from the entire side face, the area in the vicinity of the curved section becomes brightest. In this manner, the brightness, which varies as it gets closer to the curved section, may be reduced by increasing the ratio of the area of the first diffusion elements in the vicinity of the curved section where the entered light should reduce most when no light source is provided at the curved section. In other words, the unevenness of brightness across the entire main face can be reduced.

In a light guide plate of the present invention, the second diffusion region may be a region including a region surrounded by a curved section and an imaginary arc having a center that is an intersection point of the extension lines of adjacent linear sections. In this manner, even though when no light source is provided at the curved section, light entered from the entire side face reduces as it gets closer to the curved section, the brightness difference between the first diffusion region and the second diffusion region can be reduced by increasing the ratio of the area of the second diffusion elements within the second diffusion region. In other words, the unevenness of brightness across the entire main face can be reduced, which provides an excellent sight.

In a light guide plate of the present invention, the second diffusion region may include a third diffusion region having second diffusion ditches at the corresponding curved section side thereof, wherein the third diffusion region has second diffusion ditches for diffusing the light emitted from the side, towards the main face. In this case, the ratio of the area of the first diffusion elements or second diffusion elements within three regions of the first diffusion region, second diffusion region, and third diffusion region increase from the center of the light guide plate toward the curved section in three levels, which correspond to the three regions respectively, and when the light enters from the entire side face, the brightness of the light varies at three levels. In this manner, as compared with a case having no third diffusion region, the unevenness of brightness across the entire main face can be further reduced.

In the light guide plate of this embodiment of the present invention, each second diffusion ditch may be provided as a continuous dotted line, or the second diffusion ditches may be formed radially from a curved section side. In this case, the ratio of the area of the second diffusion ditches increases as it gets close to the curved section side, and thus, when the light enters from the entire side face, the area in the vicinity of the curved section becomes brightest. In this manner, the brightness, which varies as it gets closer to the curved section, may be reduced by increasing the ratio of the area of the second diffusion elements in the vicinity of the curved section where the entered light should reduce most when no light source is provided at the curved section. In other words, the unevenness of brightness across the entire main face can be reduced.

In a light guide plate of the present invention, the third diffusion region may be a region where the first diffusion ditches and the second diffusion ditches are arranged alternately one by one. In this manner, periodically providing the first diffusion ditches and the second diffusion ditches provides an excellent sight due to the periodical shape, and reduces the brightness difference within the third diffusion region when light is uniformly emitted from the entire side face. In other words, the unevenness of brightness across the entire main face can be reduced, and an excellent sight can be provided.

In a light guide plate of the present invention, the third diffusion region has a shape similar to the second diffusion region. In this manner, when light sources are placed facing each linear section, the distances from each light source to the third diffusion region and second diffusion region become the same, and thus the brightness difference between the third diffusion region and the second diffusion region can be reduced. In other words, the brightness difference across the entire main face can be reduced.

In a light guide plate of the present invention, the main face has a triangle, quadrangle, pentagon or hexagon shape. When the main face has such a shape, the application of the present invention provides a significant advantage because, in a conventional light guide plate, the unevenness of brightness across the entire main face becomes great when no light source is provided at the curved section.

A display unit of the present invention may comprise: any one of the above mentioned light guide plate; a plurality of the LEDs positioned at the outer side of the linear sections and emitting light toward the side face of the linear sections. A display unit of the present invention may comprise: any one of the above mentioned light guide plate; a plurality of LEDs emitting light into the side face of the linear sections, wherein the main face of the light guide plate has a pentagon shape, the plurality of LEDs is positioned at the outer side of four linear sections of the five linear sections defining the pentagon shape, the light guide plate is installed such that a linear section without a plurality of LEDs at the outer side thereof comes the upper side. In any case, even though the amount of light emitted from the LEDs reduces as it gets closer to each apex of the light guide plate, the brightness difference, which varies as it gets closer to each apex, can be reduced due to any one of the above mentioned light guide plates. At this time, since the number of LEDs can be reduced as compared with a case that LEDs are placed on the entire side face, electric power is further saved. In other words, a light device that reduces power consumption, and also reduces the brightness difference across the entire main face can be provided.

A display unit of the present invention may be placed on a curved section, and comprise the reflection member reflecting light guided toward the curved face of the curved section. In this manner, the vicinity of the curved section becomes brighter as light guided toward the curved surface side of the curved section is reflected by the reflection member, and thus the degree of reduction of the brightness, which varies as it gets closer to the curved section, can be reduced.

The display unit of the present invention may comprise a reflection plate adjacent to one side of the main face where the diffusion dots are provided, wherein the reflection plate reflects light emitted from the main face; and, a milky-white plate adjacent to one side of the main face where the diffusion dots are not provided, wherein the milky-white plate displays a given information. In this manner, as compared with the case having no reflection plate, the information displayed on the milky-white plate can be brighter, and the brightness difference across the display can be reduced.

A traffic sign of the present invention includes: any one of the above mentioned displays; and a display part having display information including letters, signs, figures, or any combination thereof. Since the traffic sign of the present invention includes any one of the above mentioned displays, the same advantageous effect as that of the above mentioned display can be obtained, for example, the power consumption is reduced and simultaneously the display information displayed on the display part is displayed with a small brightness difference across the entire traffic sign.

In the traffic sign of the present invention, the display part may be a film attached on the front surface of the milky-white plate. In this manner, the display part can be provided by a simple operation of attaching a film on the front surface of the milky-white plate.

A method of manufacturing a light guide plate of the present invention comprises:

(a) a first diffusion element forming step forming the plurality of first diffusion elements on the main face; and (b) a second diffusion element forming step forming the second diffusion elements on the second diffusion region, Since the method of manufacturing a light guide plate of the present invention includes a first diffusion element forming step forming the plurality of first diffusion elements on the main face; and a second diffusion element forming step forming the second diffusion elements on the second diffusion region, a light guide plate where the brightness difference across the entire main face is reduced can be manufactured.

A method of manufacturing a light guide plate of the present invention may comprise: (a) a diffusion dot forming step forming the plurality of diffusion dots on the main face, wherein the plurality of diffusion dots have a shape, to which the processing dot is reflected, by pushing processing dots provided on the face of the distal end of the ultrasonic processing horn; and (b) after the diffusion dot processing step, a diffusion ditch forming step forming the second diffusion elements in the second diffusion region using a laser processing machine. In this manner, a light guide plate where the brightness difference is reduced across the entire main face can be manufactured by forming a plurality of diffusion dots on the main face by pushing the processing dots, and then forming the second diffusion elements within the second processing region by using a laser processing machine.

A method of manufacturing a light guide plate of the present invention may comprise: (a) a first diffusion element forming step forming a plurality of first diffusion elements on the main face, (b) a diffusion ditch forming step forming the second diffusion ditches within the third diffusion region. In this manner, a light guide plate where the brightness difference across the entire main face is reduced can be manufactured as compared with a light guide plate with no second diffusion ditch.

A method of manufacturing a light guide plate of the present invention may comprise: (a) a diffusion dot forming step forming the plurality of diffusion dots on the main face, wherein the plurality of diffusion dots have a shape, to which the processing dot is reflected, by pushing processing dots provided on the face of the distal end of the ultrasonic processing horn; (b) after the diffusion dot processing step, a diffusion ditch forming step forming the second diffusion elements within the third diffusion region using a laser processing machine; and (c) after the diffusion dot processing step, a second diffusion ditch forming step forming the second diffusion elements within the third diffusion region using a laser processing machine. In this manner, a light guide plate where the brightness difference across the entire main face is reduced can be manufactured as compared with a light guide plate with no second diffusion ditch.

A method of manufacturing a traffic sign, comprising: a light guide plate of the present invention guiding light entered from the side face toward the main face thereof; a display film provided on the surface of the main face, wherein the display film displays display information including letters, signs, figures, or any combination thereof; and LEDs placed at the outer side of the light guide plate, and emitting light into the side face of the light guide plate, (a) a diffusion dot forming step forming the plurality of diffusion dots on the main face, wherein the plurality of diffusion dots have a shape, to which the processing dot is reflected, by pushing processing dots provided on the face of the distal end of the ultrasonic processing horn; and (b) after the diffusion dot processing step, a diffusion ditch forming step forming the second diffusion elements within the second diffusion region using a laser processing machine; and (c) an assembling step positioning the LEDs on the side face of the a linear section, thereby the light guide plate, in which the brightness difference is entirely reduced is manufactured.

The method of manufacturing of the traffic sign of the present invention can manufacture a traffic sign where the brightness difference across the entire main face is reduced even though light is emitted from the LEDs placed on the side face of the linear sections because a light guide plate manufactured by the method capable of reducing the brightness difference across the entire main face is used.

DESCRIPTION OF PREFERRED EMBODIMENTS

Figure 1:
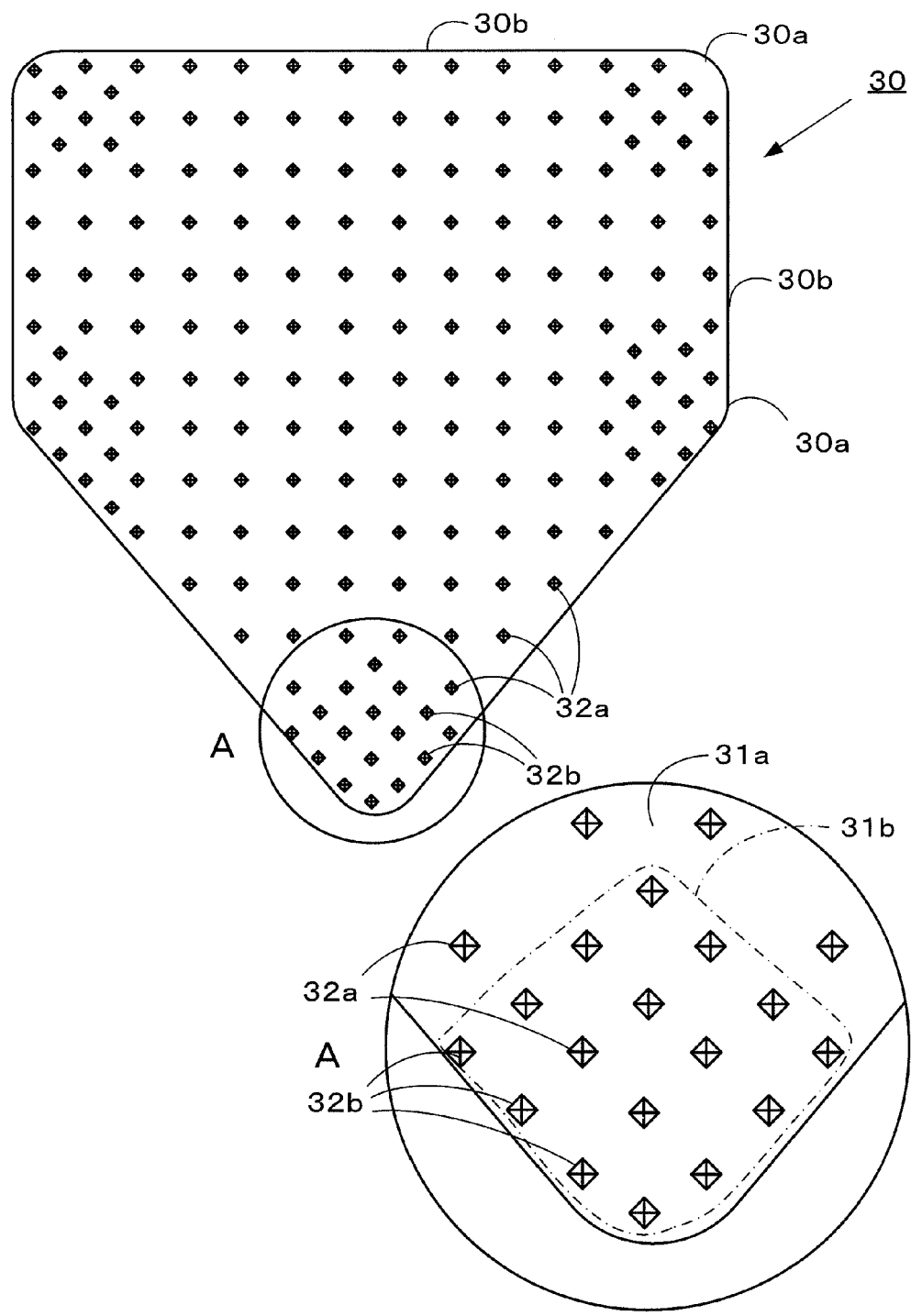
FIG. 1 is a schematic front view of the configuration of a light guide plate 30.

Here, based on the drawings briefly explained above, the correspondence relationships between the constituent elements of the embodiments and the constituent elements of the present invention are clarified to explain the embodiments of the present inventions. Of the embodiment, a light guide plate 30 corresponds to a light guide plate. A curved section 30a corresponds to a curved section. A linear section 30b corresponds to a linear section. A first diffusion region 31a corresponds to a first diffusion region. A second diffusion region 31b corresponds to a second diffusion region. A third diffusion region 31c corresponds to a third diffusion region. First diffusion dots 32a correspond to first diffusion elements. First diffusion dots 32a, second diffusion dots 32b and third diffusion dots 32c correspond to diffusion dots. A first diffusion ditch 132 corresponds to a first diffusion ditch. A white-light-emitting-type LED 54 corresponds to a LED. A reflection seal 28 corresponds to a reflection member. A reflection plate 22 corresponds to a reflection plate. A milky-white plate 24 corresponds to a milky-white plate. A display film 12 corresponds to a display film. The description of a method of manufacturing the display unit 20 including the light guide plate 30 should also clarify an example of a method of manufacturing the light guide plate 30, display unit 20 and traffic sign 10 of the present invention.

In explanation of an embodiment of the present invention, firstly, referring to FIG. 1, the light guide plate 30, which is one exemplary embodiment of the present invention, will be described, and then the display unit 20 and the traffic sign 10 having the light guide plate 30 will be described. FIG. 1 is a schematic front view of the configuration of the light guide plate 30 of a first embodiment of the present invention, in which the lower right section shows an enlarged plan view of region A.

The light guide plate 30 has a thickness of about 4 mm to about 8 mm, and is a permeable plate made of methacrylate resin, having a substantially pentagon shape. This shape of the light guide plate 30 is defined by: the linear sections 30b, each of which forms a part of each side face of the substantially pentagon shape; and the curved sections 30a, each of which interconnects adjacent linear sections 30b. This light guide plate 30 has a back face having a plurality of first diffusion dots 32a, and also having second diffusion dots 32b in the vicinity of each apex thereof. In this configuration, when light uniformly enters into the light guide plate 30 from the entire side faces, the light guide plate 30 becomes brighter in regions in the vicinity of each apex thereof as compared with the other locations. The region in the vicinity of each apex where first diffusion dots 32a are provided densely (a region surrounded by a dashed-dotted line in FIG. 1) is the second diffusion region 31b, and the regions other than the second diffusion regions 31b are the first diffusion regions 31a. In the following description, the back face of the light guide plate 30 refers to a main face of the light guide plate 30 having the first diffusion dots 32a and second diffusion dots 32b. The front face of the light guide plate 30 refers to a main face of the light guide plate 30 without the first diffusion dots 32a and second diffusion dots 32b.

Each of the first diffusion dots 32a and second diffusion dots 32b is a recess having a substantially quadrangular pyramid shape, and is provided such that the part corresponding to the base of the quadrangular pyramid is placed on the back face of the light guide plate 30. Each side face of the quadrangular pyramid has a length of 0.6 mm-1.5 mm, and the first diffusion dot 32a and second diffusion dot 32b have a depth of 0.4 mm-0.8 mm. The pitch between adjacent first diffusion dots 32a is about 1.5 mm-about 8.0 mm. For convenience of illustration, in FIG. 1, the size of the first diffusion dots 32a and second diffusion dots 32b is illustrated larger than the actual size, and their numbers are less than the actual numbers. In fact, smaller and more first diffusion dots 32a and second diffusion dots 32b will be formed.

Now, the second diffusion region 31b will be described in more details. As shown in the lower right section of FIG. 1, the second diffusion region 31b is a region in the vicinity of each apex of the light guide plate 30, and has second diffusion dots 32b in addition to first diffusion dots 32a. Specifically, the second diffusion dots 32b, which have the same shape as the first diffusion dots 32a, are arranged such that they are offset by half a pitch relative to the pitch distance between the first diffusion dots 32a. In addition, the second diffusion region 31b is, for example, preferably within a radius of 20.0 mm-300.0 mm from each apex of the light guide plate 30, and more preferably, 30.0 mm-250.0 mm. In this manner, the density (per area) of the first diffusion dots 32a and second diffusion dots 32b in the second diffusion region 31b becomes twice as much as the density (per area) of the first diffusion dots 32a in the first diffusion region 31a. Thus, when the same amount of light enters into the light guide plate 30 from the entire side face, the second diffusion region 31b allows the front face of the light guide plate 30 to be brighter as compared with the first diffusion region 31a. As a result, for example, even if light source units 50 are provided only at locations facing to the linear sections 30b (see FIG. 3), the brightness of the second diffusion regions 31b are made substantially the same as that of the first diffusion region 31a. In this manner, the brightness of the entire light guide plate 30 is made substantially uniform without any light source unit 50 at the side face of the curved sections 30a, and thus no light source unit 50 is required to be provided in the vicinity of any apex of the light guide plate 30. The range of the second diffusion region 31b can be determined as appropriate depending on the degree of the angle of the curved section 30a and/or the size of the light guide plate 230.

Figure 2:
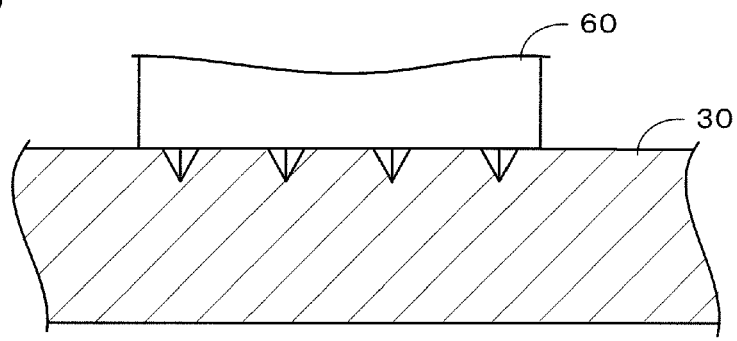
FIGS. 2(A)-2(C) are explanatory diagrams showing the process of forming first diffusion dots 32a and second diffusion dots 32b on the light guide plate 30.
Figure 2:
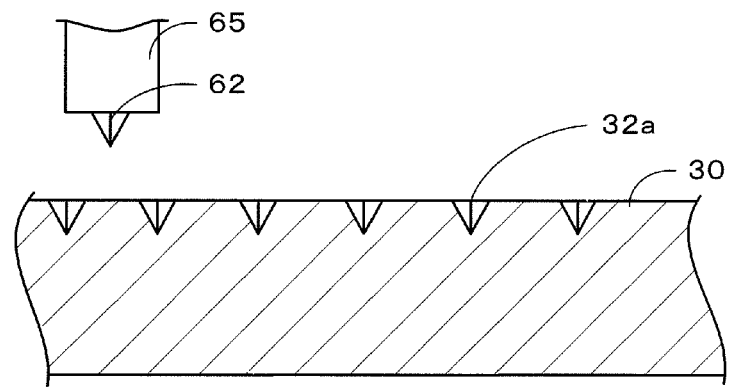
Figure 2:
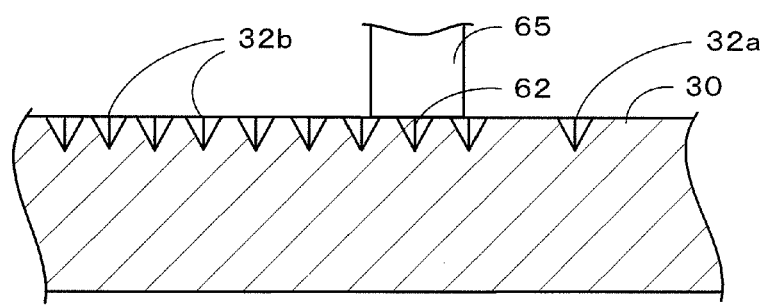

Next, referring to FIG. 2, one example of a method of manufacturing the light guide plate 30 of this embodiment configured in this manner will be further described. Here, FIG. 2 is an explanatory diagram to explain a method of forming the first diffusion dots 32a and second diffusion dots 32b. When the first diffusion dots 32a are formed in the light guide plate 30, as shown in FIG. 2(A), a ultrasonic processing horn 60 where ultrasonic vibrations are applied is pressed against the resin plate to form the first diffusion dots 32a. This ultrasonic processing horn 60 is connected to a known ultrasonic processing machine (not shown), and has a 4×4 matrix of processing dots 62. Each processing dot 62 has a substantially quadrangular pyramid shape, and is provided on the distal end of the ultrasonic processing horn 60. Therefore, when the ultrasonic processing horn 60 is pressed against the light guide plate 30 with ultrasonic vibrations applied the first diffusion dots 32a are formed, which reflect the shape of the processing dots 62.

In order to form the second diffusion regions 31b, the first diffusion dots 32a are first formed on the entire surface of the light guide plate 30 using the above method, and then, as shown in FIG. 2(B), a ultrasonic processing horn 65 is positioned between a first diffusion dot 32a and a first diffusion dot 32a, and is pressed against the light guide plate 30 with ultrasonic vibrations applied to the ultrasonic processing horn 65, and thereby the second diffusion dots 32b are formed, which reflect the shape of the processing dots 62 provided on the distal end face of the ultrasonic processing horn 65. At this time, as shown in FIG. 2(c), forming the second diffusion dots 32b at a midpoint between a first diffusion dot 32a and a first diffusion dot 32a results in light being diffused periodically, which gives an excellent sight. In addition, as the second diffusion region has more diffusion dots by the second diffusion dots 32b as compared with the first diffusion region 31a, it can look brighter as compared to the case without the second diffusion dots 32b.

Figure 3:
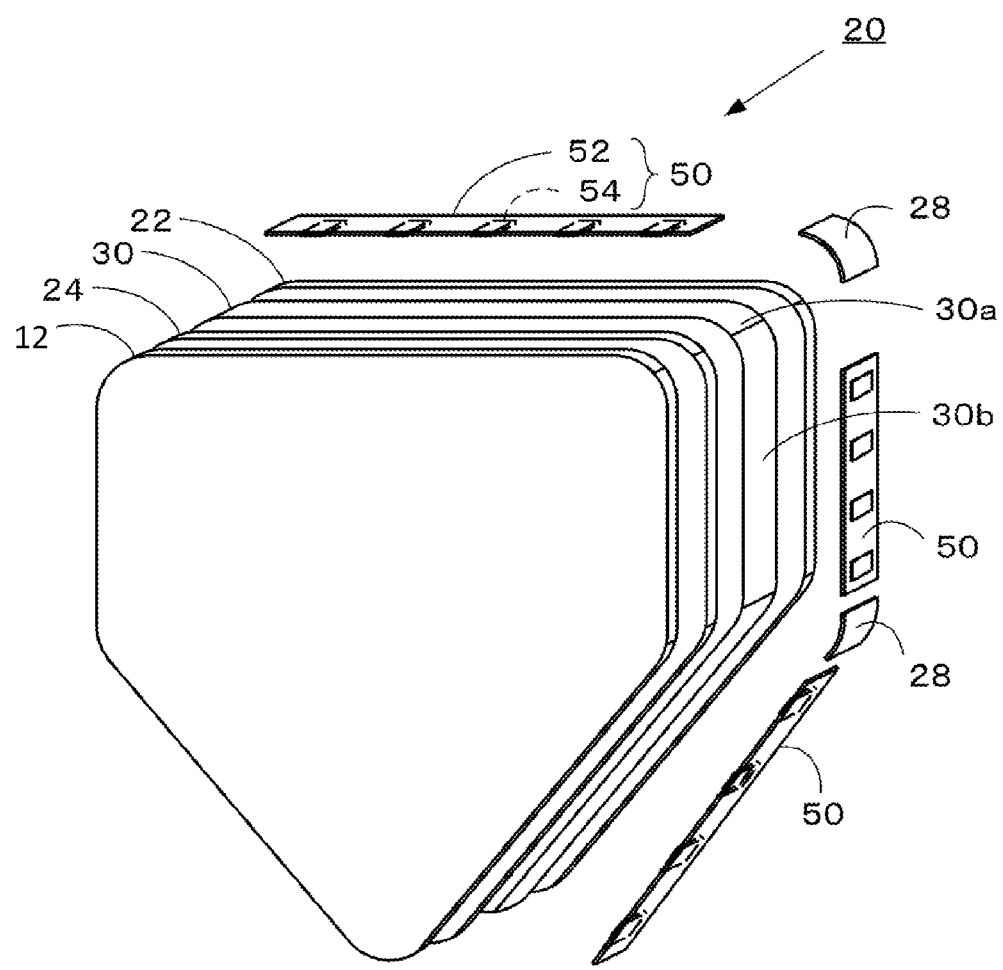
FIG. 3 is a schematic perspective view of the configuration of a display unit 20.

Next, referring to FIG. 3, the display unit 20 having the above light guide plate 30 will be described in details. Here, FIG. 3 is a schematic perspective view of the configuration of the display unit 20. The display unit 20 includes: the above-described light guide plate 30; a reflection plate 22 provided on the back face of the light guide plate 30; a milky-white plate 24 provided on the front face of the light guide plate 30; a reflection seal 28 provided on a side face of a curved section 30a in the vicinity of each apex of the light guide plate 30; a light source unit 50 provided at a position facing to a linear section 30b, which is a part of each side of the light guide plate 30, and the display unit 20 is fixed by a frame (not shown) from the side. In this display unit 20, when light is emitted from the light source unit 50 into the side face of the light guide plate 30a, the light is guided mainly to the front face by the light guide plate 30. On the other hand, of the light emitted from the light source unit 50, light guided toward the curved section 30a is reflected by the reflection seal 28 provided on the curved section 30a, and is re-guided by the light guide plate 30. Such a configuration allows the entire main face to have a substantially uniform brightness without darkening a region in the vicinity of each apex even though no light source unit 50 is provided in the vicinity of any apex of the light guide plate 30. In other words, as no light source unit 50 is required in the vicinity of each apex, the labor to place a light source unit 50 in a curving manner can be reduced, and also as the number of light source units 50 is reduced, the power consumption can be reduced.

The reflection plate 22 is an opaque white plastic plate having a substantially identical shape to the light guide plate 30, and reflects light guided toward the back face of the light guide plate 30, toward the front face of the light guide plate 30. Therefore, the front face of the light guide plate 30 becomes brighter as compared to a case without the reflection plate 22.

A milky-white plate 24 is a milky-white, translucent resin plate having a substantially identical shape to the light guide plate 30, and scatters and transmits light diffused by the first diffusion dots 32a and second diffusion dots 32b. Such a configuration reduces the possibility of the first diffusion dots 32a and second diffusion dots 32b being visually recognized, and makes the entire front face bright, which results in reducing the possibility of causing the unevenness of brightness on the surface of the light guide plate 30.

The reflection seal 28 is an opaque white plastic film or sheet member having a width substantially identical to the thickness of the light guide plate 30, and reflects light guided toward the side face of the light guide plate 30, toward the center of the light guide plate 30. Therefore, the area in the vicinity of each apex of the light guide plate 30 provided with the reflection seal 28 becomes brighter as compared with a case without the reflection seal 28.

The light source unit 50 includes; a substrate 52; and a plurality of surface-mounted white-light-emitting-type LEDs 54 (hereinafter referred to as "LEDs 54") mounted on the substrate 52 in a spaced apart relationship to each other, and emits light into the side face of the light guide plate 30. This light source unit 50 is provided at a position facing a linear section 30b, which is a part of each side of the light guide plate 30. If it is provided on a curved section 30a, it is required to be processed in a curved shape similar to the curved section 30a. Therefore, the present invention can save the labor for the curving process. In addition, the light source unit 50 may be waterproofed or dripproofed. Specifically, for example, epoxy resin or the like may be potted on the substrate 52, or the substrate 52 may be coated completely hermetically, or the light source unit 50 may be enclosed in a silicon tube or the like. In this manner, even if condensation occurs inside the display unit 20, or raindrops or the like enter inside face the display unit 20, the possibility of the light source unit 50 being failed or malfunctioned may be reduced. The light source unit 50 may be placed on the outside of the first diffusion region 31a only, or may be placed on the outside of both the first diffusion region 31a and the second diffusion region 31b.

As discussed above, in the display unit 20, the milky-white plate 24 is placed on the front face of the light guide plate 30, the reflection plate 22 is placed on the back face of the light guide plate 30, a reflection seal 28 is placed on a curved section 30b of the light guide plate 30, and a light source unit 50 is positioned facing a linear section 30a. In this condition, the display unit 20 is fixed by a frame (not shown).

Figure 4:
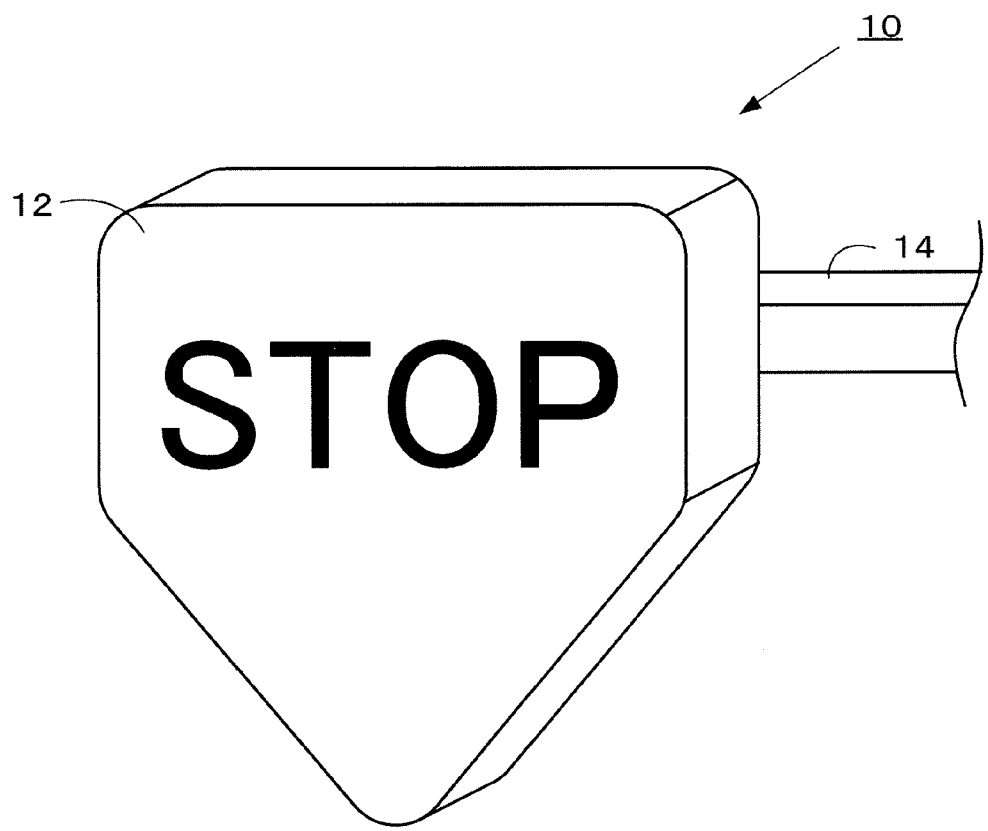
FIG. 4 is a schematic perspective view of the configuration of a traffic sign 10.

Now, referring to FIG. 4, a traffic sign 10 of the display unit 20 will be described in details. Here, FIG. 4 is a schematic perspective view of the configuration of the traffic sign 10. The traffic sign 10 includes: the display unit 20 shown in FIG. 3; and a supporting pole 14 placed at the back face of the display unit 20, and a display film 12 having a display information (for example, the letters "STOP") is attached on the surface of the milky-white plate 24. In this traffic sign 10, when light is emitted from a light source unit 50 of the display unit 20 into the side face of the light guide plate 30, the light is guided mainly toward the front face of the light guide plate 30, and the display information of the display film 12 is indicated. On the other hand, of the light emitted from the light source unit 50, light guided toward a curved section 30a is reflected by a reflection seal 28 provided on the curved section 30a, and is re-guided by the light guide plate 30. Such a configuration prevents an area in the vicinity of each apex of the display film 12 from darkening, and allows the entire display film 12 to have a uniform brightness, and thereby the display information of the display film 12 can be displayed in a uniform brightness, which provides an excellent visibility.

The supporting pole 14 is a pillar-like member made of iron, and is fixed at the back face of the display unit 20 at one end, and the other end is fixed to a desired location, and thereby the traffic sign 10 is fixed and installed at a desired location.

As described above, the traffic sign 10 has the display film 12 on the front face of the display unit 20, and is placed at a desired location by the supporting pole 14, of which one end is fixed to the traffic sign 10. Note that the installation of the supporting pole 14 is not limited to this configuration, but the supporting pole 14 may be installed, for example, on the upper wall of the entrance and/or exit of tunnels and the like.

Figure 5:
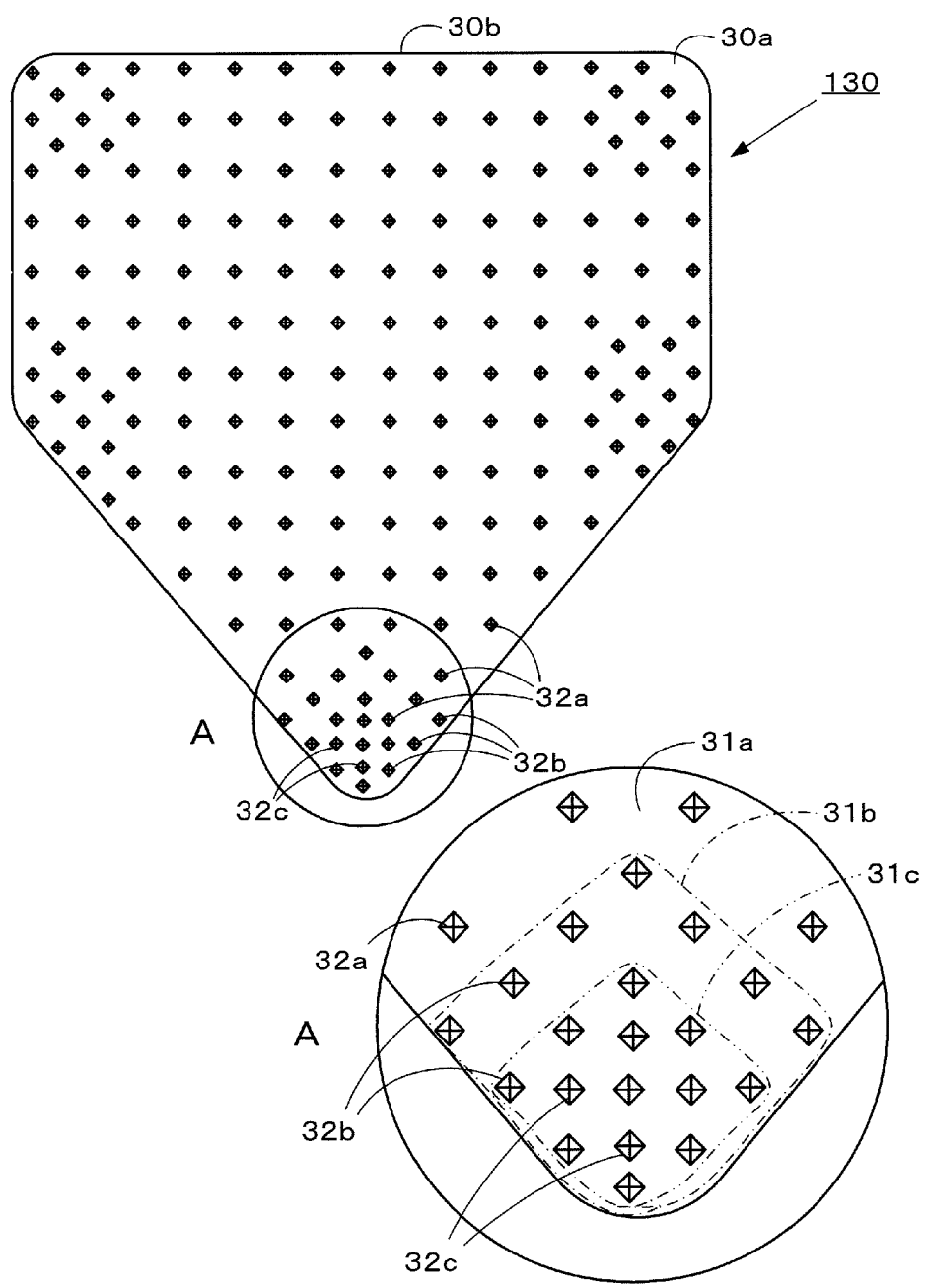
FIG. 5 is a schematic front view of the configuration of a light guide plate 130.

Next, in a second embodiment of the present invention, the schematic of the configuration of a light guide plate 130 is described in details, referring to FIG. 5. Here, FIG. 5 is a schematic front view of the configuration of the light guide plate 130. Note that portions similar to those of the first embodiment are referred to by like numerals, and the description of these portions are omitted. As compared with the light guide plate 30, a light guide plate 130 is different in that at least one third diffusion region 31c is provided.

As shown in FIG. 5, the light guide plate 130 has a third diffusion region 31c (in FIG. 5, a region surrounded by a chain double-dashed line), which is closer to a corresponding apex within the second diffusion region 31b. This third diffusion region 31c is provided with third diffusion dots 32c in addition to a plurality of first diffusion dots 32a and second diffusion dots 32b provided in the second diffusion region 31b. Specifically, the third diffusion region 31c is, for example, preferably within a radius of 30.0 mm-200.0 mm from each apex of the light guide plate 30, and more preferably 50.0 mm-150.0 mm. Each of these third diffusion dots 32c is provided half way between a first diffusion dot 32a or second diffusion dot 32b and an adjacent first diffusion dot 32a or second diffusion dot 32b in the second diffusion region 31b, and thus the density (per area) of the diffusion dots within third diffusion region 31c is twice as much as the first diffusion dots 32a and second diffusion dots 32b within the second diffusion region 31b, and four times as much as those within the first diffusion region 31a. Therefore, when the same amount of light enters from the entire side face of the light guide plate 30, the front face of the light guide plate 30 can be brighter as compared with the first diffusion region 31a and second diffusion region 31b. As a result, for example, even when a light source unit 50 is provided at a position facing a linear section 30b, the density (per area) of the diffusion dots changes in two phases as it gets away from the light source unit 50, and thus, even though no light source unit 50 is provided on an area in the vicinity of each apex of the light guide plate 130, the unevenness of the brightness of the entire light guide plate 130 can be reduced. The range of the third diffusion region 31c may be determined as appropriate depending on the degree of the angle of the curved section 30a and/or the size of the light guide plate 130.

In the above second embodiment, the size of the third diffusion dots 32c of the light guide plate 130 is the same as that of the second diffusion dots 32b, but they may be smaller than that of the second diffusion dots 32b. In this case, the same advantageous effect as that of the above embodiment can be obtained. Similarly, the second diffusion dots 32b are smaller than the first diffusion dots 32a, and in this case also, the same advantageous effect as that of the above embodiment can be obtained.

If, in place of the light guide plate 30 provided in the display unit 20 and traffic sign 10, the light guide plate 130 is used to configure the display unit 20 or traffic sign 10, the display unit 20 or traffic sign 10 can obtain the same advantageous effect as that of the light guide plate 130, for example, the entire main face of the light guide plate 130 is brightened in a uniform degree. At this time, the configuration of and the method of manufacturing display unit 20 and traffic sign 10 remain the same except that the light guide plate 30 is replaced with the light guide plate 130, and the description is omitted.

Figure 6:
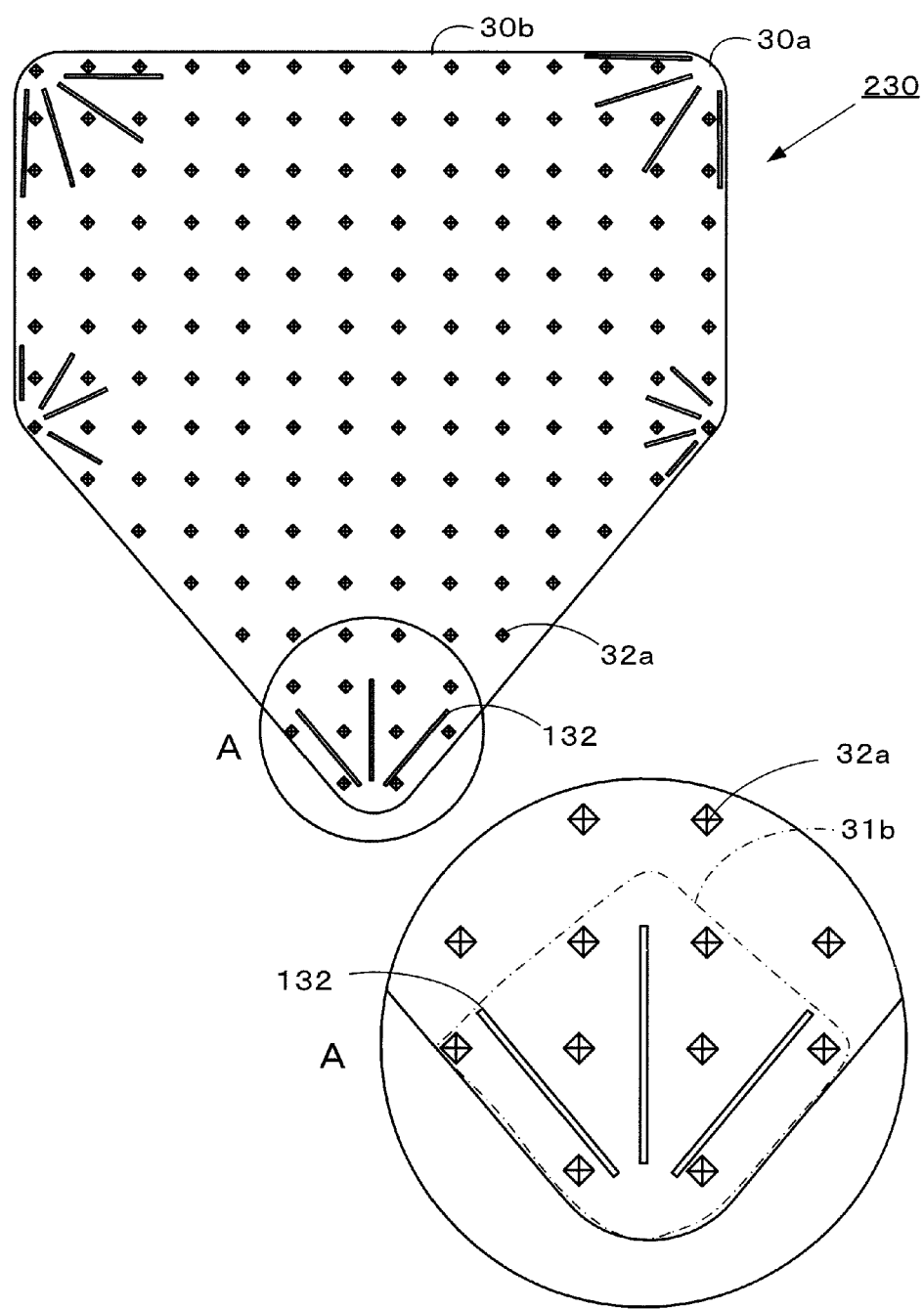
FIG. 6 is a schematic front view of the configuration of a light guide plate 230.

Next, refereeing to FIG. 6, the configuration of the light guide plate 230 of the third embodiment of the present invention is described in detail. Here, FIG. 6 is a schematic front view of the configuration of a light guide plate 230. Note that portions similar to those of the first embodiment are referred to by like numerals, and the description of these portions is omitted. As compared with the light guide plate 30, a light guide plate 230 is different in that no second diffusion dot 32b is provided in the second diffusion region 31b, but a plurality of first diffusion ditches 132 are provided.

As shown in FIG. 6, the light guide plate 230 has the plurality of first diffusion ditches 132 in the second diffusion region 31b. These first diffusion ditches 132 are radially arranged from the curved section 30a toward the center of the light guide plate 230, and thus the first diffusion ditches 132 are arranged close to each other in the vicinity of the curved section 30a, and the first diffusion ditches 132 become distant to each other as they are away from the curved section 30a. In this manner, when light is uniformly emitted from the side face of the light guide plate 230, the density (per area) in a region (for diffusing light) having both first diffusion dots 32a and first diffusion ditches 132 becomes greater as it gets closer to the curved section 30a, and thus the main face looks brighter as it gets closer to the curved section 30a. As a result, for example, even when a light source unit 50 is provided at a position facing a linear section 30b, the density (per area) of the first diffusion dots 32a and the first diffusion ditches 132 becomes greater as it gets away from the light source unit 50, and thus, even though no light source unit 50 is provided at an area in the vicinity of each apex of the light guide plate 30, the unevenness of brightness of the entire light guide plate 230 can be reduced.

Now, the first diffusion ditches 132 are described in further detail. The first diffusion ditches 132 are ditches provided on the front face of the light guide plate 230. The width of each first diffusion ditch 132 is, for example, preferably 0.2 mm-1.0 mm, and more preferably 0.4 mm-0.6 mm. In addition, the length of each first diffusion ditches 132 extending from the curved section 30a towards the center of the light guide plate 230 is, for example, preferably 20.0 mm-300.0 mm, and more preferably 30.0 mm-250.0 mm. The width and length of the first diffusion ditch 132 can be determined as appropriate depending on the degree of the angle of the curved section 30a and/or the size of the light guide plate 230.

Figure 7:
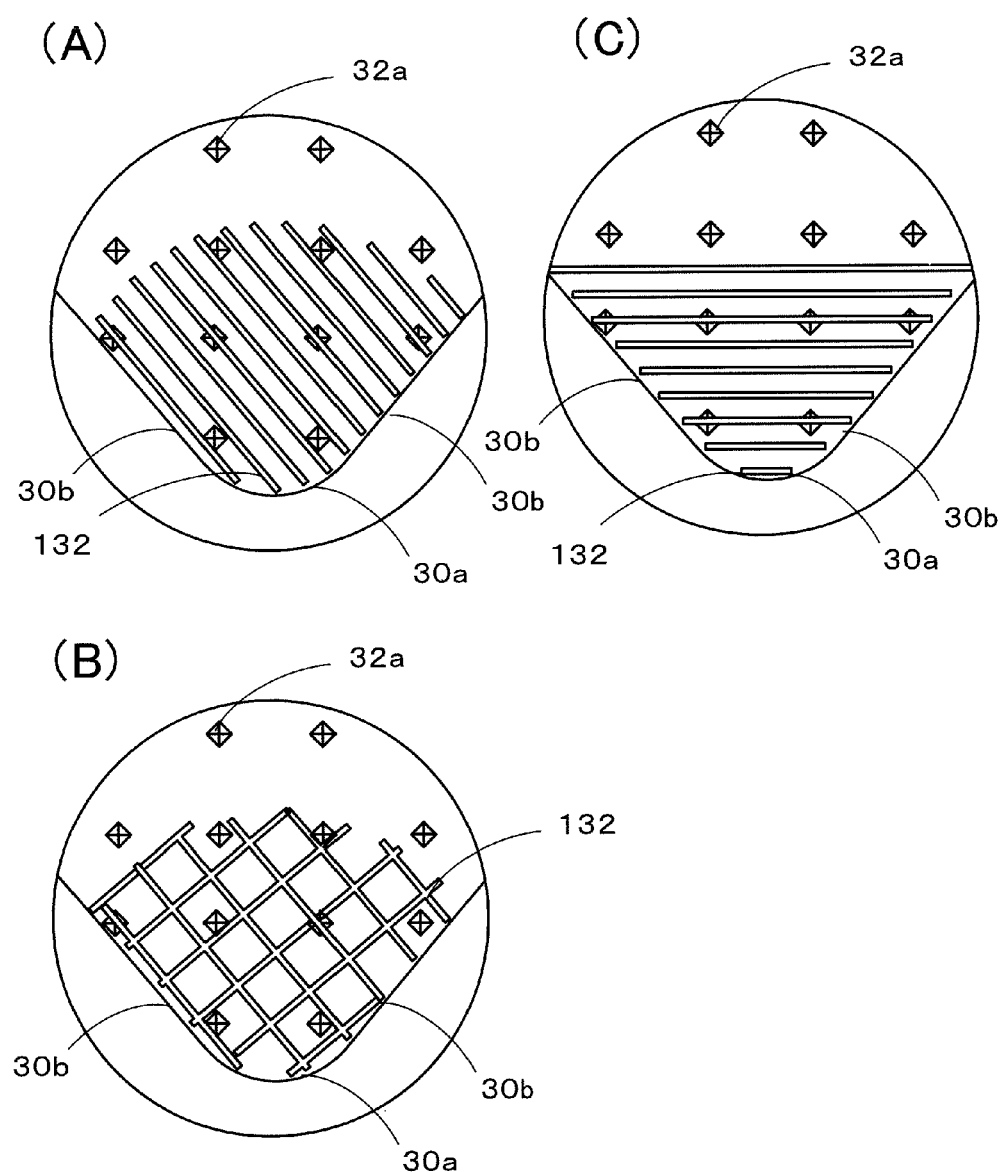
FIGS. 7(A)-7(C) are schematic front views of the configurations of other embodiments of the light guide plate 230.

In the light guide plate 230 of the above third embodiment, the first diffusion ditches 132 are arranged radially from the curved section 30a toward the center of the light guide plate 230. However, as shown in FIG. 7(A), the first diffusion ditches 132 may be arranged substantially parallel with one of linear sections 30b adjacent to a curved section 30a. In this manner, for example, when a light source unit 50 is provided on one of the linear sections 30b adjacent to the curved section 30a, the first diffusion ditches 132 are provided substantially parallel with the linear section 30b having the light source unit 50, and thus light emitted from the light source unit 50 can be sufficiently diffused toward the main face.

In the light guide plate 230 of the above third embodiment, the first diffusion ditches 132 are radially arranged from the curved section 30a toward the center of the light guide plate 230. However, as shown in FIG. 7(B), a plurality of first diffusion ditches 132 may be arranged substantially parallel with a linear section 30b adjacent to a curved section 30a to form a lattice, or, as shown in FIG. 7(C), may be arranged parallel with each other in a direction away from the curved section 30a. In this manner, for example, even when a light source unit 50 is provided on one of linear sections 30b adjacent to a curved section 30a, light emitted from the light source unit 50 can be sufficiently diffused toward the main face, and thus the unevenness of the brightness of the entire light guide plate 130 can be reduced.

Figure 8:
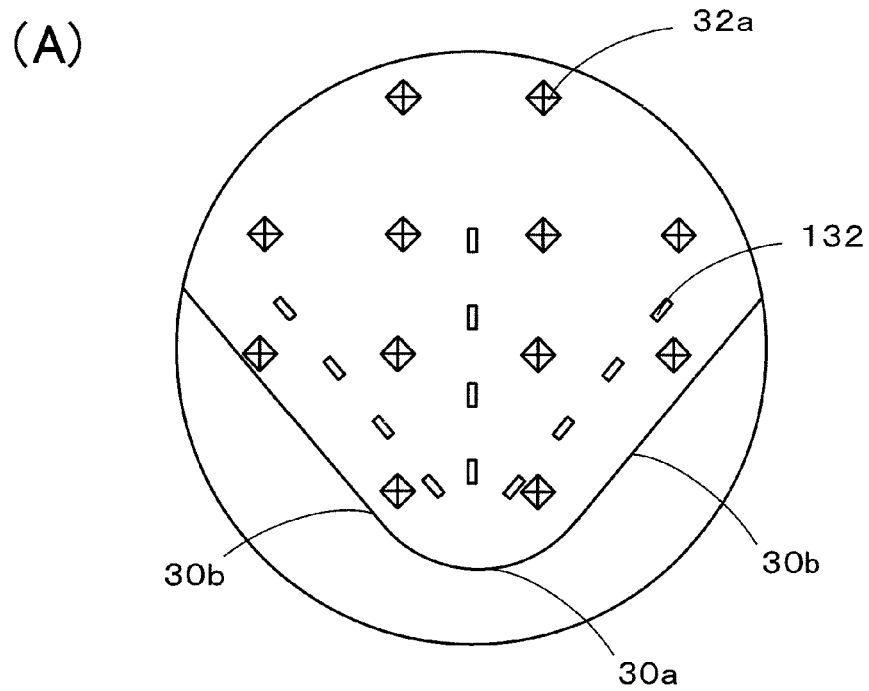
FIGS. 8(A)-8(B) are schematic front views of the configurations of other embodiments of the light guide plate 230.
Figure 8:
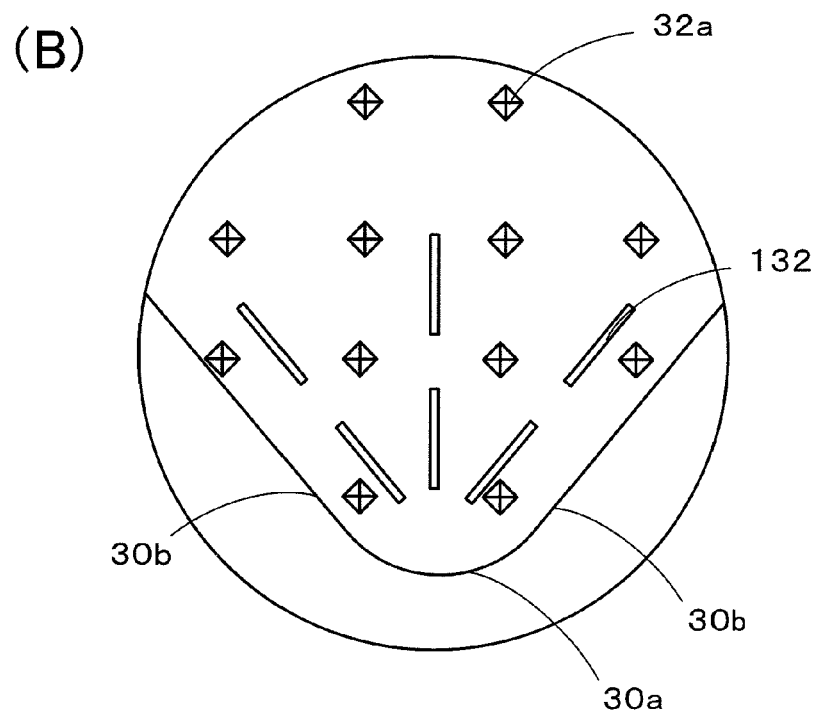

In the light guide plate 230 of the above third embodiment, each first diffusion ditch 132 is a linear ditch. However, as shown in FIG. 8(A), it may be an evenly-spaced dotted line, or as shown in FIG. 8(B), it may be a dotted line having long ditches with a short distance between them. In either case, it can obtain the same advantageous effect as that of the above third embodiment. Note, the orientation of this line may be any of the above discussed orientations. In any case, it can obtain the same advantageous effect as that of the third embodiment.

Figure 9:
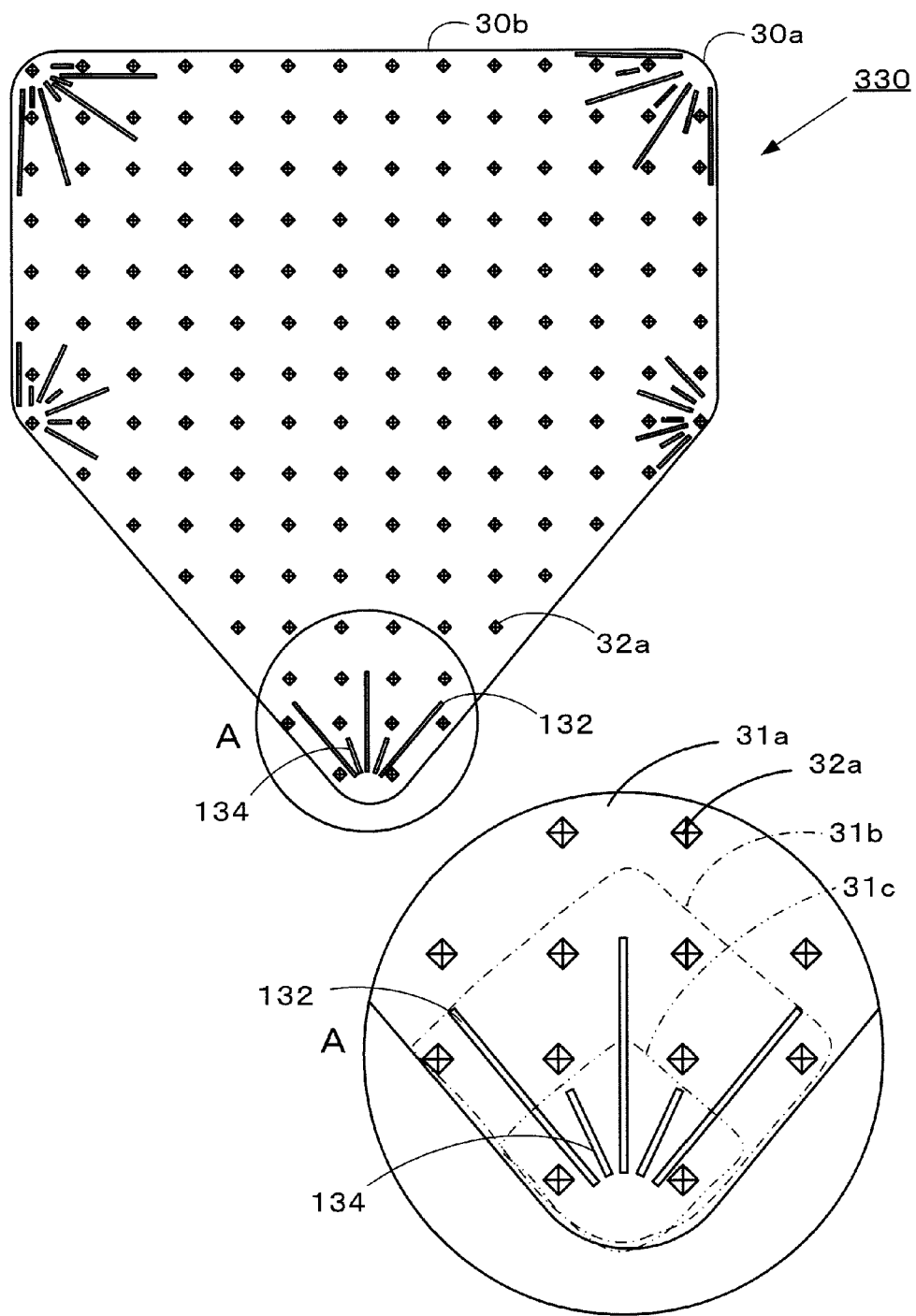
FIG. 9 is a schematic front view of the configuration of a light guide plate 330.

Next, referring to FIG. 9, the schematic configuration of a light guide plate 330 of a fourth embodiment of the present invention is described in detail. Here, FIG. 9 is a schematic front view of the configuration of the light guide plate 330. Note that portions similar to those of the third embodiment are referred to by like numerals, and the description of these portions are omitted. As compared with the light guide plate 230, the light guide plate 330 is different in that at least one third diffusion region 31c is provided.

As shown in FIG. 9, the light guide plate 330 has a third diffusion region 31c at an area closer to each apex within a first diffusion region 31a. This third diffusion region 31c has second diffusion ditches 134 in addition to a second diffusion region 31b. The second diffusion ditches 134 of the third diffusion region 31c are radially arranged between adjacent first diffusion ditches 132, toward the center of the light guide plate 330 from a corresponding curved section 30a. In this manner, when light is uniformly emitted from the entire side face of the light guide plate 330, the density (per area) of the first diffusion ditches 132 and second diffusion ditches 134 within the third diffusion region 31c (hereinafter also referred to as "diffusion ditches 136") becomes greater than that in the second diffusion region 31b, and thus the main face looks brighter as it gets closer to the curved section 30a. As a result, for example, even when a light source unit 50 is provided at a position facing to a linear section 30b, and no light source unit 50 is provided at an area in the vicinity of each apex of the light guide plate 30, the unevenness of brightness of the entire light guide plate 330 can be reduced because the density (per area) of the diffusion ditches 136 becomes greater as it gets away from the light source unit 50.

Figure 10:
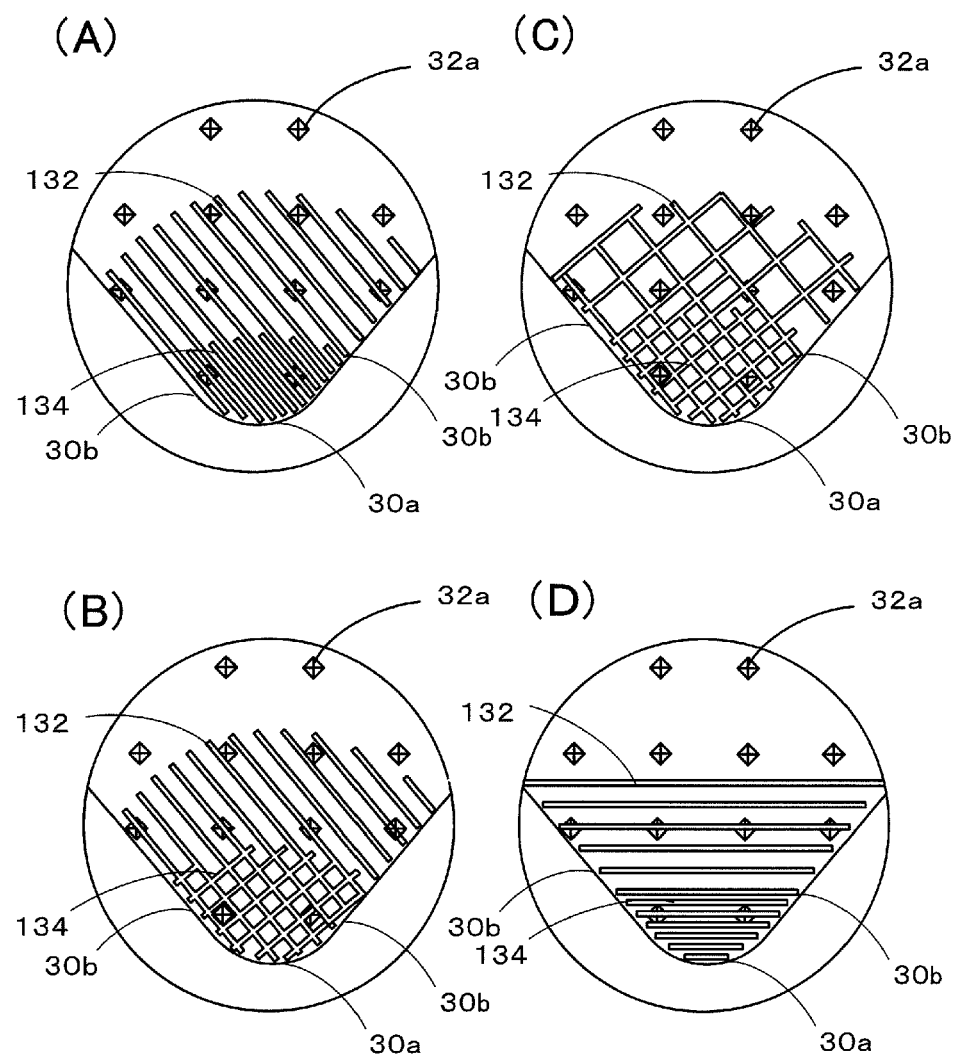
FIGS. 10(A)-10(D) are schematic front views of the configurations of other embodiments of the light guide plate 330.

In the above fourth embodiment, a second diffusion ditch 134 is provided between adjacent first diffusion ditches 132, which are radially arranged from the curved section 30a toward the center of the light guide plate 330. However, as shown in FIG. 10(A), first diffusion ditches 132 and second diffusion ditches 134 may be arranged alternatively one by one, substantially parallel with one of linear sections 30b adjacent to a curved section 30a. In this manner, for example, when a light source unit 50 is provided on one of the linear sections 30b adjacent to the curved section 30a, the first diffusion ditches 132 and second diffusion ditches 134 are provided substantially parallel with the linear section 30b having the light source unit 50, and thus light emitted from the light source unit 50 can be sufficiently diffused toward the main face.

In the above fourth embodiment, a second diffusion ditch 134 is provided between adjacent first diffusion ditches 132. However, as shown in FIG. 10(B), second diffusion ditches 134 may be arranged orthogonal to first diffusion ditches 132 such that the first diffusion ditches 132 and the second diffusion ditches 134 form a lattice. Or, as shown in FIG. 10(C), first diffusion ditches 132 are arranged in a lattice pattern, and second diffusion ditches 134 are also arranged in a lattice pattern, which is a smaller lattice than the lattice of the first diffusion ditch 132. Or, as shown in FIG. 10(D), first diffusion ditches 132 and second diffusion ditches 134 are arranged parallel to each other in a direction away from the curved section 30a. In this manner, for example, even when a light source unit 50 is provided on one of the linear sections 30b adjacent to a curved section 30a, light emitted from the light source unit 50 can be sufficiently diffused toward the main face.

In the above fourth embodiment, a second diffusion ditch 134 is provided between adjacent first diffusion ditches 132, which are radially arranged from the curved section 30a toward the center of the light guide plate 330. However, as shown in FIG. 10(B), second diffusion ditches 134 may be arranged orthogonal to first diffusion ditches 132 arranged substantially parallel with one of linear sections 30b adjacent to a curved section 30a.

Figure 11:
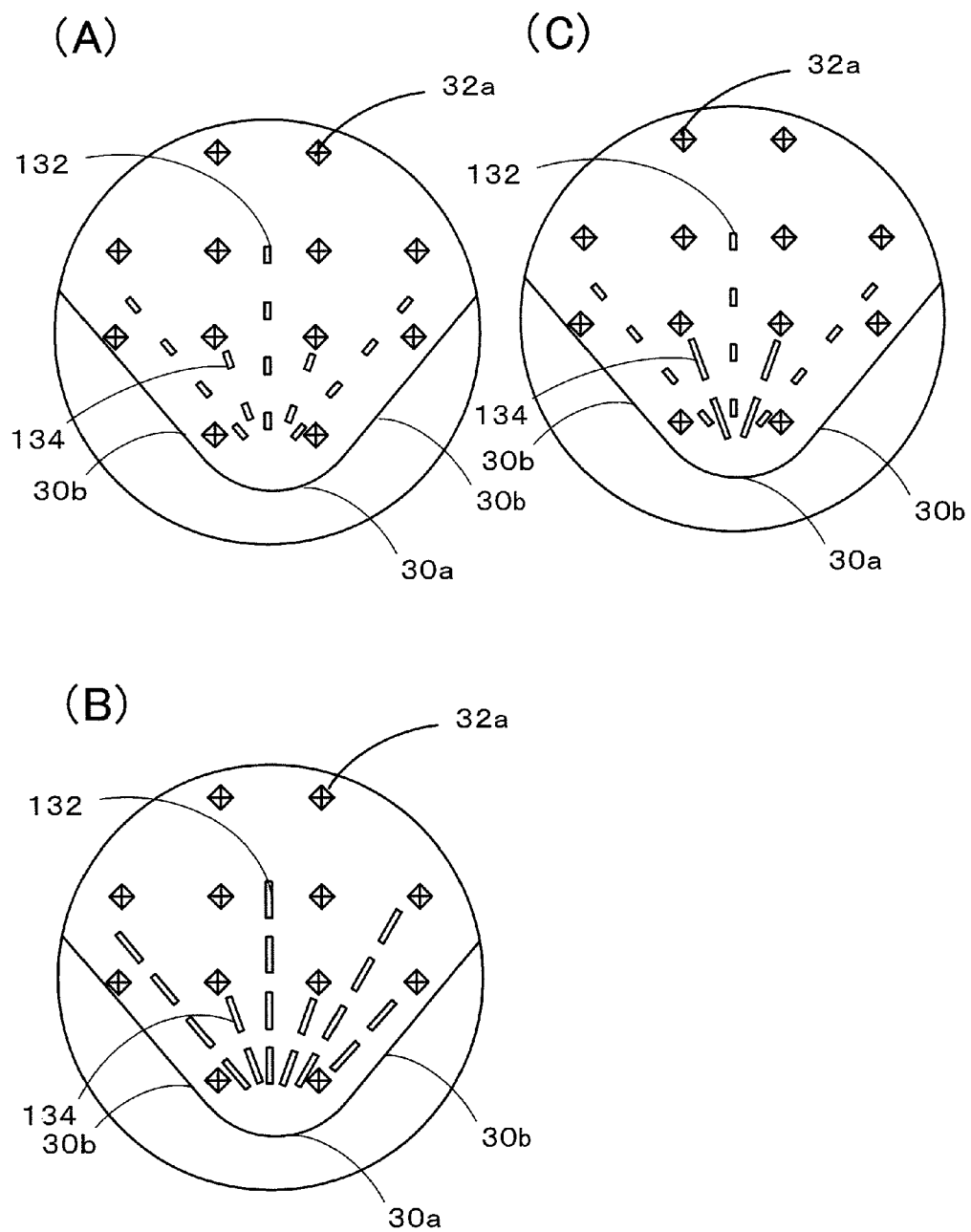
FIGS. 11(A)-11(C) are schematic front views of the configurations of other embodiments of the light guide plate 330.

In the fourth embodiment, each of the first diffusion ditch 132 and the second diffusion ditch 134 is a linear ditch. However, as shown in FIG. 11(A), it may be a dotted line at regular intervals, or as shown in FIG. 11(B), it may be a dotted line having long ditches with a short distance between them, or as shown in FIG. 11(C), the length of each first diffusion ditch 132 may be different from the length of each second diffusion ditch 134. In any case, the same advantageous effect as that of the above fourth embodiment can be obtained.

Figure 19:
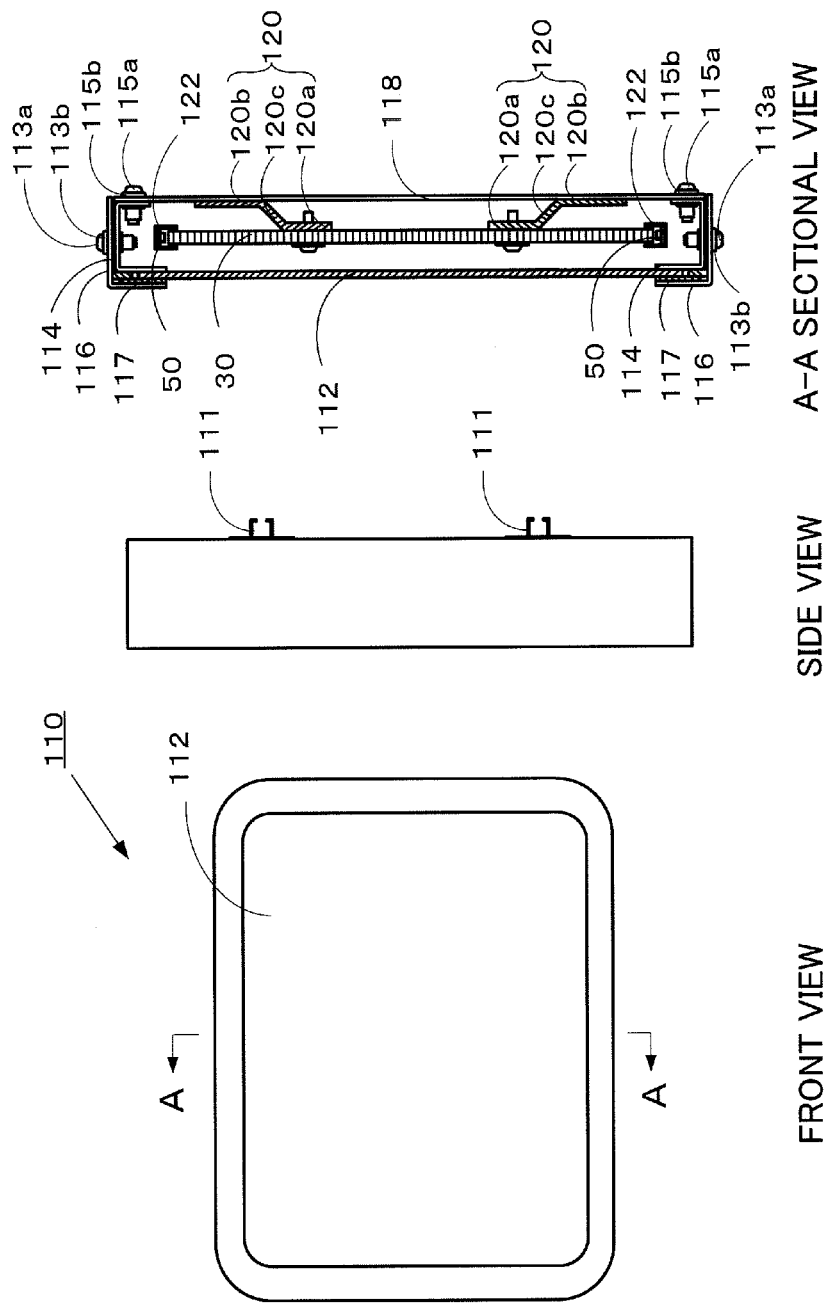
FIG. 19 is a schematic explanatory diagram of the configuration of a traffic sign 110.

Next, referring to FIG. 19, the configuration of a traffic sign 110 of another embodiment of the present invention is described in detail. FIG. 19 is a schematic front view, a side face view and an A-A sectional view of the configuration of the traffic sign 110. Note that portions similar to those of the first embodiment are referred to by like numerals, and the description of these portions are omitted. As shown in FIG. 19, this traffic sign 110 has: a display board 112 on the front face side; and two fixtures 111 on the back face side for supporting the traffic sign 110 by fixing to a pole or the like (not shown). Here, the lower side of the traffic sign 110 has a through hole (not shown). In this manner, even if condensation occurs inside the traffic sign 110, or raindrops or the like enter inside the traffic sign 110, the inside water can be discharged.

In the traffic sign 110, as shown in FIG. 19, a L-shaped side frame 116 is fixed to the front face side of a body frame 114 by bolts 113a, the display board 112 is held between the body frame 114 and the side frame 116. Here, a waterproof washer 113b is sandwiched between the body frame 114 and a bolt 113a, and a buffer member 117 is sandwiched between the display board 112 and the side frame 116, which provides an excellent waterproof performance, and allows the traffic sign 110 to be installed outdoor. In addition, a back plate 118 is fixed to the back face side of the body frame 114 by bolts 115a, and the light guide plate 30 is fixed to the back plate 118 by fixing members 120. Here, a waterproof washer 115b is sandwiched between the back plate 118 and a bolt 115*a*, which provides an excellent waterproof performance.

As shown in FIG. 19, a fixing member 120 has an upper face 120*a* and a lower face 120*b*, which are parallel to each other, and has a shape that the upper face 120*a* and the lower face 120*b* are connected via an inclined plane 120*c*. The upper face 120*a* and the lower face 120*b* of the fixing member 120 are fixed to the light guide plate 30 and the back plate 118, respectively. In this manner, the light guide plate 30 can be fixed without contacting to the body frame 114, side frame 116, or back plate 118. For example, if condensation occurs inside face the traffic sign 110, or raindrops or the like enter inside the traffic sign 110, the raindrops accumulates in the lower part of the traffic sign 110, but the accumulated water will be discharged from a through hole (not shown) provided at the lower part of the traffic sign 110, and also the possibility of the light source unit 50 or the light guide plate 30 being failed or malfunctioned by the water accumulated in the lower part of the traffic sign 110 can be reduced because the light guide plate 30 and the light source unit 50 are positioned away from the lower part of the traffic sign 110.

Similarly to the first embodiment, a light source unit 50 is provided on the linear section of each side face of the light guide plate 30, and the light source unit 50 is fixed to the side face of the light guide plate 30 by a U-shaped light-source fixing member 122. In this manner, light is emitted from the light source unit 50 into the side face of the light guide plate 30, and is diffused toward the main face of the light guide plate 30 by the light guide plate 30.

Figure 20:
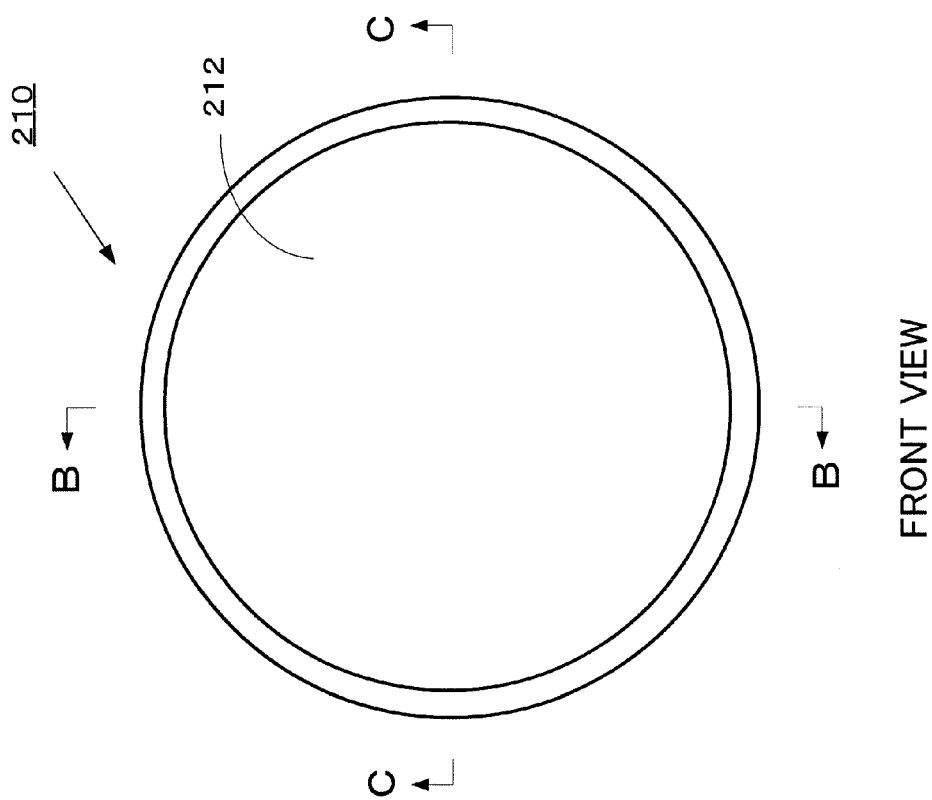
FIG. 20 is a schematic front view of the configuration of a traffic sign 210.
Figure 21:
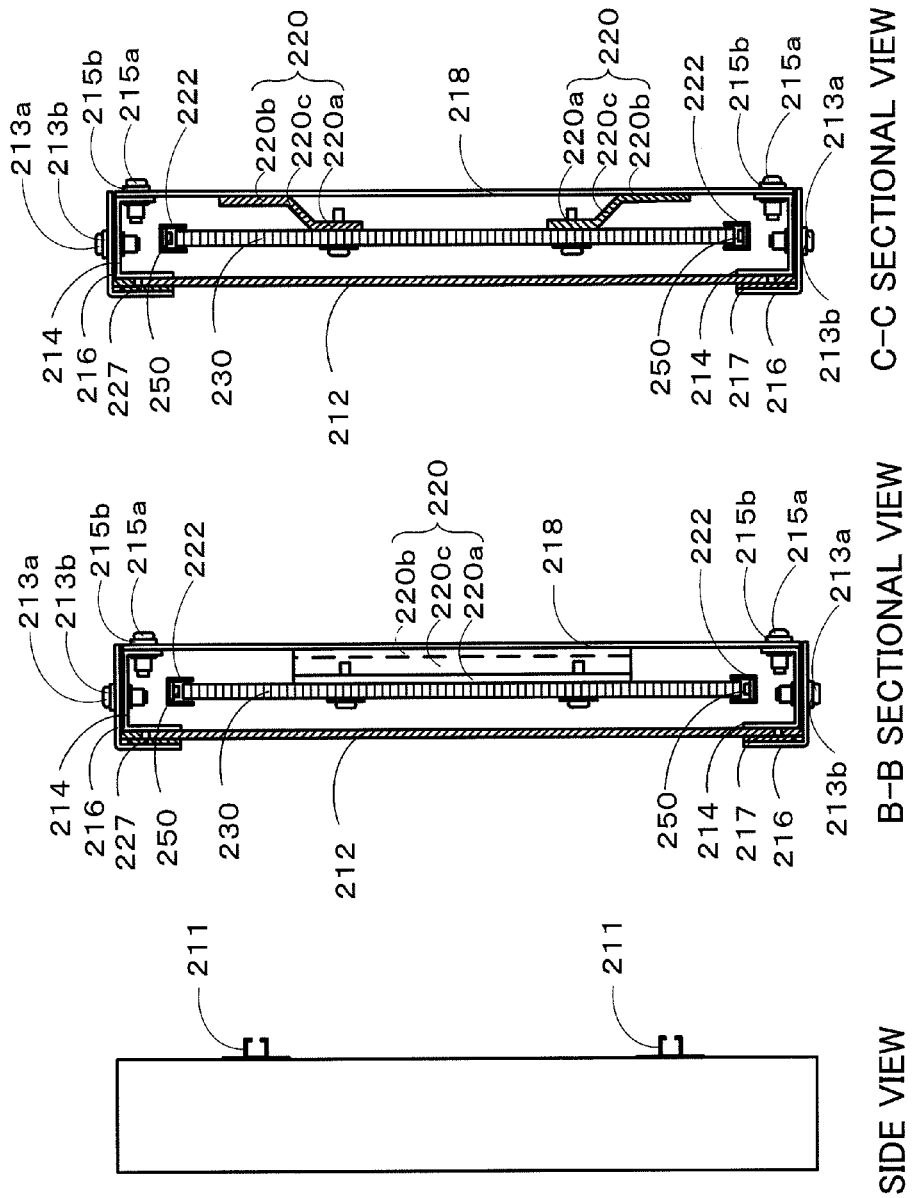
FIG. 21 is a schematic an explanatory diagram of the configuration of the traffic sign 210.

Next, referring to FIG. 20 and FIG. 21, the configuration of a traffic sign 210 of another embodiment of the present invention is described in detail. Here, FIG. 20 is a front view of the traffic sign 210. FIG. 21 is a side face view, a B-B sectional view and a C-C sectional view of the schematic configuration of the traffic sign 210. As shown in FIG. 21, this light guide plate 210 has: a display board 212 on the front face side; and two fixtures 211 on the back face side for supporting the traffic sign 210 by fixing to a pole or the like (not shown). Here, the lower side of the traffic sign 110 has a through hole (not shown). In this manner, even if condensation occurs inside the traffic sign 210, or raindrops or the like enter inside the traffic sign 210, the water moves along the arc of the lower face side and can be automatically discharged. The light guide plate 230 included in the traffic sign 210 is one that the shape of the light guide plate 30 of the first embodiment is made discoid, and therefore its description will be omitted herein.

In the traffic sign 210, as shown in FIG. 21, a L-shaped side frame 216 is fixed by bolts 213*a* on the front face side of the body frame 214, and a display board 212 is held between the body frame 214 and the side frame 216. Here, a waterproof washer 213*b* is sandwiched between the body frame 214 and a bolt 213*a* and a buffer member 217 is sandwiched between the display board 212 and the side frame 216, which provides an excellent waterproof performance, and allows the traffic sign 210 to be installed outdoor. In addition, a back plate 218 is fixed to the back face side of the body frame 214 by bolts 215*a*, and the light guide plate 230 is fixed to the back plate 218 by fixing members 220. Here, a waterproof washer 215*b* is sandwiched between the back plate 218 and a bolt 215*a*, which provides an excellent waterproof performance. In addition, if condensation occurs inside the traffic sign 210, or raindrops or the like enter inside face the traffic sign 210, the raindrops accumulate in the lower part of the traffic sign 210, but the accumulated water will be discharged from a through hole (not shown) provided at the lower part of the traffic sign 210, and also the possibility of the light source unit 250 or the light guide plate 230 being failed or malfunctioned by the water accumulated in the lower part of the traffic sign 210 can be reduced because the light guide plate 230 and the light source unit 250 are positioned away from the lower part of the traffic sign 110. Here, the shape of the fixing member 220 is the same as that of the fixing member 120, and therefore its description is omitted.

A light source unit 250 is provided on the side face side of the light guide plate 230, and, the light source unit 250 is fixed to the side face side of the light guide plate 230 by a U-shaped light-source fixing member 222. In this manner, light is emitted from the light source unit 250 into the side face of the light guide plate 230, and is diffused toward the main face of the light guide plate 230 by the light guide plate 230. Here, the configuration of the light source unit 250 is the same as that of the light source unit 50, and therefore its description is omitted.

According to the light guide plate 30 of this embodiment described above, as the ratio of the area of the first diffusion dots 32*a* and second diffusion dots 32*b* of the second diffusion region 31*b* is greater than the ratio of the area of the first diffusion dots 32*a* of the first diffusion region 31*a*, the difference of brightness (the unevenness of brightness) across the entire main face can be reduced even when no light source unit 50 is provided at a corresponding curved section 30*a*.

In addition, as the second diffusion region 31*b* has first diffusion ditches 132 in addition to second diffusion dots 32*b*, the difference of brightness (the unevenness of brightness) across the entire main face can be reduced even when no light source unit 50 is provided at a corresponding curved section 30*a*.

In addition, as each first diffusion ditch 132 is an evenly spaced dotted line, and a plurality of the first diffusion ditches 132 are radially formed from the curved section 30*a* toward the center, the density (per area) of the dotted lines becomes grater as it gets closer to the curved section 30*a*. In this manner, the difference of brightness (the unevenness of brightness) across the entire main face can be reduced even when no light source unit 50 is provided at a corresponding curved section 30*a*.

Furthermore, as a part of a second diffusion region 31*b* at the curved section 30*a* side has a third diffusion region 31*c*, and thus the total density (per area) of the diffusion dots 32 and the diffusion ditches 136 becomes gradually greater from the center toward the curved section 30*a* in the order of the first diffusion region 31*a*, the second diffusion region 31*b*, and the third diffusion region 31*c*, the difference of brightness (the unevenness of brightness) across the entire main face can be reduced as compared with a case without the third diffusion region 31*c*.

Here, as second diffusion ditches 134 each is an evenly-spaced dotted line and are radially formed from a corresponding curved section 30*a* toward the center, the density (per area) of the dotted lines becomes grater as it gets closer to the curved section 30*a*. In this manner, the difference of brightness (the unevenness of brightness) across the entire main face can be reduced even when no light source unit 50 is provided at the curved section 30*a*.

Furthermore, as a second diffusion ditch 134 is provided between adjacent first diffusion ditches 132, and the first diffusion ditches 132 and the second diffusion ditches 134 are arranged alternately one by one in the second diffusion region 31*b*, the unevenness of brightness in the second diffusion region 31*b* is reduced, and the difference of brightness (the unevenness of brightness) across the entire main face can be reduced.

Furthermore, as the third diffusion region 31*c* has a shape similar to the second diffusion region 31*b*, and thus the distance from a light source unit 50 provided at a linear section 30b to the second diffusion region 31b or first diffusion region 31a is the same, the difference of brightness (the unevenness of brightness) between the third diffusion region 31c and the second diffusion region 31b can be reduced. In other words, the difference of brightness (the unevenness of brightness) across the entire main face can be reduced.

In addition, as the light guide plate 30 has a substantially pentagon shape, and thus there are five curved sections 30a where no linear light source unit 50 can be provided, the advantageous effect of the application of the light guide plate 30 is grater as compared with a case that the light guide plate has a circular shape.

It should be appreciated that the present invention should not be limited to the above described embodiments, but it can be implemented in various embodiments as far as these embodiments belong to the technical scope of the present invention.

For example, any of the above first embodiment-fourth embodiment may be combined to make a light guide plate, and a light device or a traffic sign may be made using the combined light guide plate. In any case, the same advantageous effect as that of the above embodiments can be obtained.

Although in the above embodiments, the first diffusion dot 32a and second diffusion dot 32b have the same size, they can be made into different sizes. For example, each side of the diffusion dots 32 may be made gradually longer and/or the depth of the diffusion dot 32 may be made gradually deeper as they get away from the light source unit 50. In this manner, as the amount of light diffused by the diffusion dots 32 increases as it gets away from the light source unit 50, the difference of brightness (the unevenness of brightness) across the entire light guide plate can be reduced.

Although in the above embodiments, the light guide plate 30 is a permeable plate made of methacrylate resin, the material is not limited to methacrylate resin as far as it has a permeability, and various materials, for example, acrylate resin (such as methyl acrylate and ethyl acrylate), ABS resin, polycarbonate, polyethylene may be used other than methacrylate resin. In any case, the same advantageous effect as that of the above embodiments can be obtained.

Although in the above embodiments, the light guide plate 30 is a permeable plate made of methacrylate resin, the first diffusion region 31a, and the second diffusion region 31b and/or third diffusion region 31c may be made different materials. For example, a certain amount of a diffusing agent may be mixed into the light guide plate 30, and/or a plurality of materials having different diffusivities may be combined. Here, a different amount of the diffusing agent from that of the first diffusion region 31a may be mixed into the second diffusion region 31b or third diffusion region 31c, and/or a material having a higher diffusivity than that of the first diffusion region 31a may be used for the second diffusion region 31b or third diffusion region 31c. In this manner, the same advantageous effect as that of the above embodiments can be obtained.

Although in the above embodiment, the diffusion dots 32 are formed using the ultrasonic processing horn 60, and the first diffusion ditches 132 and second diffusion ditches 134 are processed using a laser processing machine, a desired method that is appropriately selected may be used for the method of processing the diffusion dots 32, first diffusion ditches 132 and second diffusion ditches 134. For example, all of the diffusion dots 32, first diffusion ditches 132 and second diffusion ditches 134 may be processed using the laser processing machine, or may be curved using a plotter. On the other hand, although the diffusion dots 32, first diffusion ditches 132 and second diffusion ditches 134 are processed in a concave shape, they may be processed, for example, in a convex shape by screen printing, silk printing or the like, or they may be processed by injection molding using a die having a concavity and convexity. In any case, the same advantageous effect as that of the above embodiments can be obtained.

Here, the first diffusion region 31a, and the second diffusion region 31b or third diffusion region 31c may be made of different materials, and the diffusion dots 32, the first diffusion ditches 132 and the second diffusion ditches 134 may be separately processed using desired processing methods. For example, a different amount of a diffusing agent from that of the first diffusion region 31a may be mixed into the second diffusion region 31b or third diffusion region 31c, and all of the diffusion dots 32, first diffusion ditches 132 and second diffusion ditches 134 may be processed using a laser processing machine, or curved using a plotter. The same advantageous effect as that of the above embodiments can be obtained by any of the above described materials and processing methods, or any combination thereof.

Example 1

Figure 12:
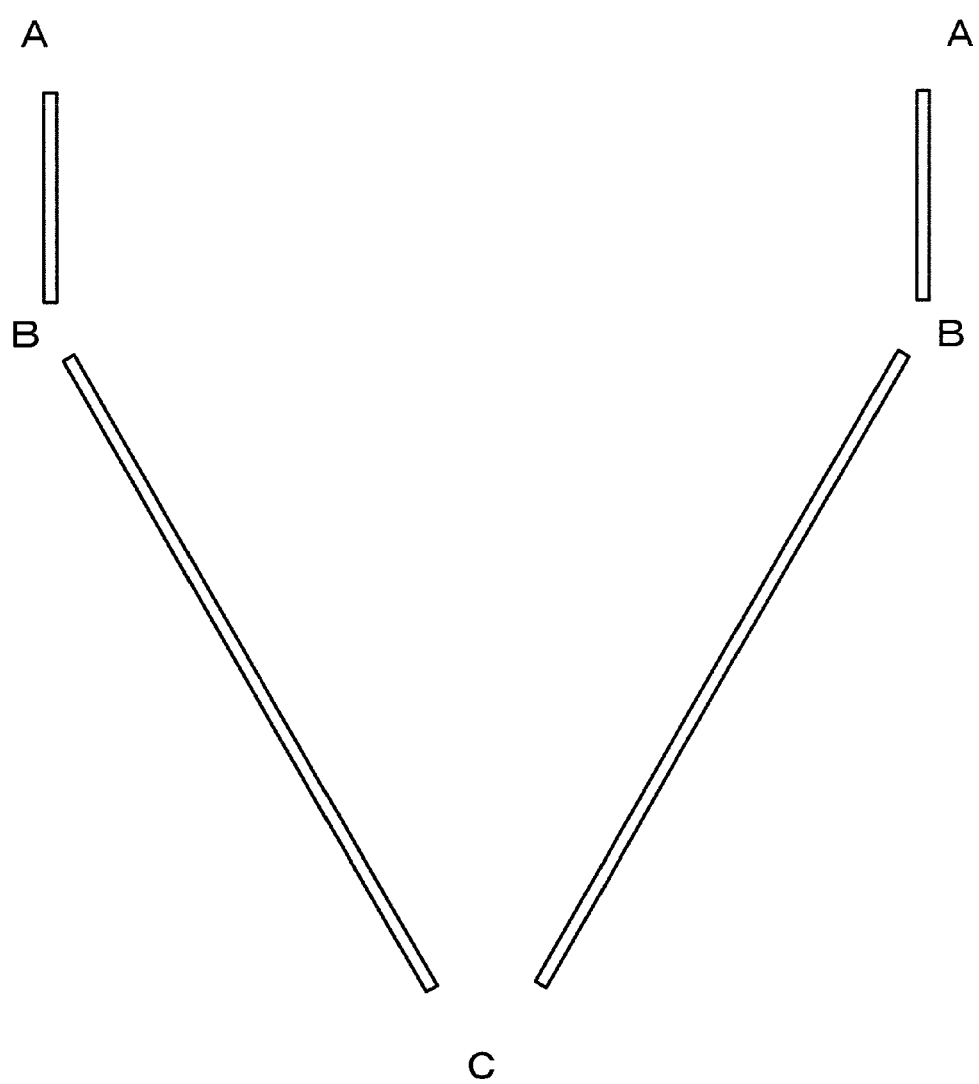
FIG. 12 is a schematic front view of the configuration of a light guide plate to measure brightness.

Next, one example of a result of brightness measurement showing the unevenness of brightness on a light guide plate is shown. FIG. 12 is a front view of the light guide plate, for which the brightness was measured. As the light guide plate used in this measurement is similar to the light guide plate 330 shown in FIG. 9 except for the shape of their diffusion ditches provided in the vicinity of each apex, its description is omitted. Diffusion dots are provided on the entire front face of the light guide plate, and diffusion ditches are formed at portions A, B and C in the vicinity of each apex.

Figure 13:
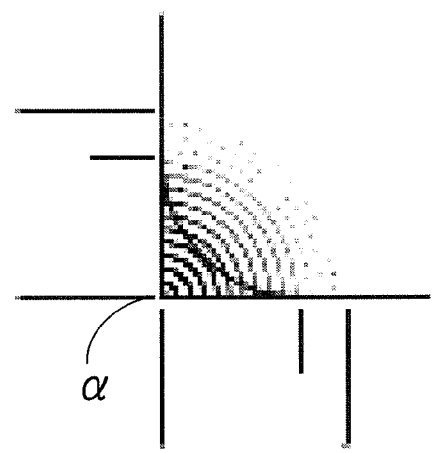
FIGS. 13(A)-13(C) are partial enlarged views of an area in the vicinity of each apex of a light guide plate.
Figure 13:
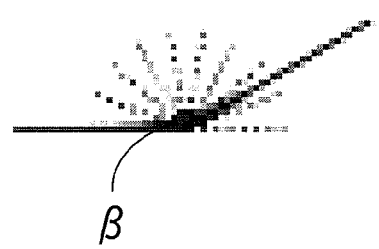
Figure 13:
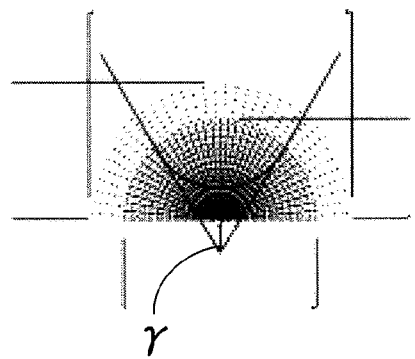

As shown in FIG. 13(A), portion A has: first diffusion ditches, each ditch consisting of dots each having a length of 1.0 mm and a width of 0.5 mm and spaced 4.0 mm apart from one another, and radially extends about intersection α of the extensions of adjacent linear sections to a distance of 70.0 mm, and is spaced 10° apart from one another; and second diffusion ditches, each ditch consisting of dots each having a length of 1.0 mm and a width of 0.5 mm and spaced 4.0 mm apart from one another, and radially extends about intersection α to a distance of 53.0 mm between adjacent first diffusion ditches.

As shown in FIG. 13(B), portion B has first diffusion ditches, each ditch consists of dots each having a length of 2.0 mm and a width of 0.5 mm and spaced 2.0 mm apart from one another, and radially extends about intersection β of the extensions of adjacent linear sections to a distance of 30.0 mm, and is spaced 20° apart from one another.

As shown in FIG. 13(C), portion C has: first diffusion ditches, each ditch consisting of dots each having a length of 1.5 mm and a width of 0.5 mm and spaced 3.5 mm apart from one another, and radially extends about intersection γ of the extensions of adjacent linear sections to a distance of 98.0 mm, and is spaced 10° apart from one another; and second diffusion ditches, each ditch consisting of dots each having a length of 4.0 mm and a width of 0.5 mm and spaced 2.0 mm apart from one another, and radially extends about intersection γ of the extensions of adjacent linear sections to a distance of 72.0 mm between adjacent first diffusion ditches.

Next, referring to FIG. 12, the positioning of light sources is described. A plurality of surface-luminescence-type white LEDs were used for the light sources, and these light sources were placed at positions schematically shown as rectangles in FIG. 12. As is clear from FIG. 12, light sources are placed on the right and left side faces of the light guide plate, and no light source is placed on the upper side face or any area in the vicinity of each apex of the light guide plate in FIG. 12. On this condition, the LEDs were lighted, and the brightness of each part of the light guide plate was measured.

Comparative Example 1

A light guide plate similar to that of Example 1 except that the first diffusion ditches and the second diffusion ditches are not formed at portions A, B or C is used, and it was measured under the same conditions as that of Example 1.

Figure 14:
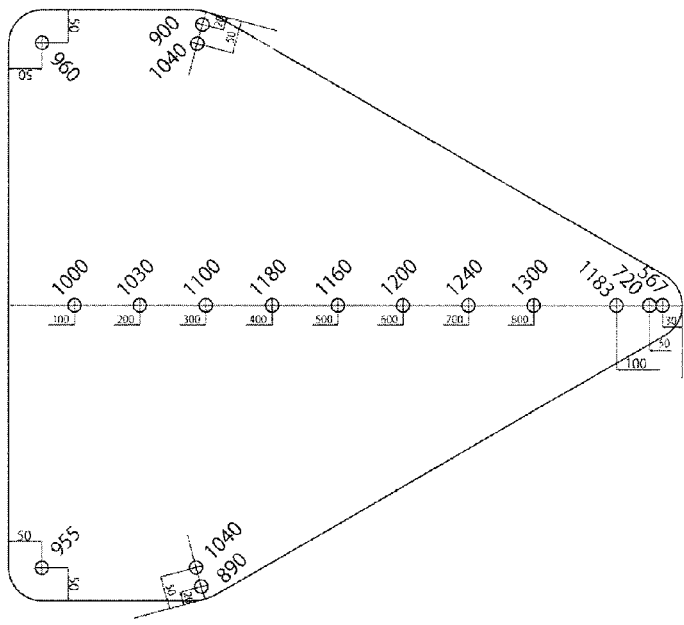
FIGS. 14(A)-14(B) are explanatory diagrams of the brightness of each portion of light guide plates.
Figure 14:
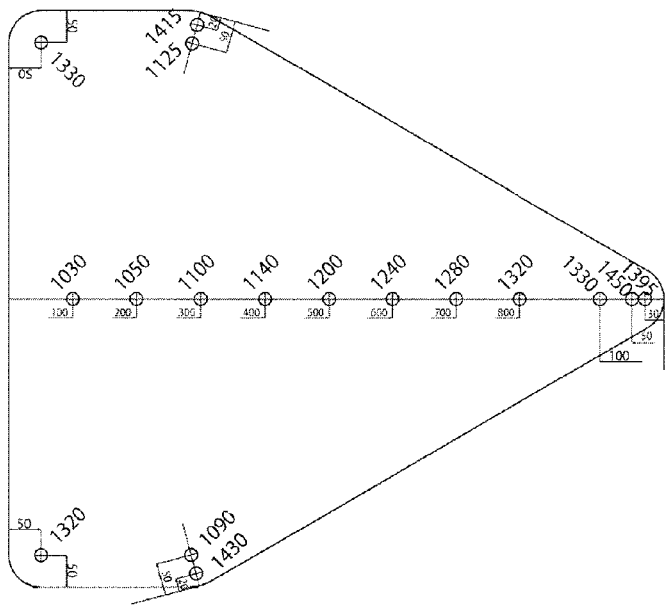

The comparative results of illuminance of each portion of the light guide plate in Example 1 and Comparative Example 1 is shown in FIGS. 14(A)-14(B). Here, FIGS. 14(A)-14(B) are the comparative results of illuminance of Example 1 and Comparative Example 1, and FIG. 14(A) shows the result of Example 1 and FIG. 14(B) shows the result of Comparative Example 1. Note that the unit of values in the figures is lux. As a result, in Example 1, the obtained result was that an area in the vicinity of the center of the light guide plate was approximately 1200 lux, while an were in the vicinity of each apex was approximately 1300-1400 lux, and the area in the vicinity of each apex was bright even though no LED was placed at a corresponding curved section. It is obvious that this result shows that the formation of the first diffusion ditches and second diffusion ditches raises brightness, as compared with the result of Comparative Example 1 where the central area was 1000-1300 lux while the area in the vicinity of each apex was 567-960 and the area in the vicinity of each apex was dark.

Example 2

Figure 15:
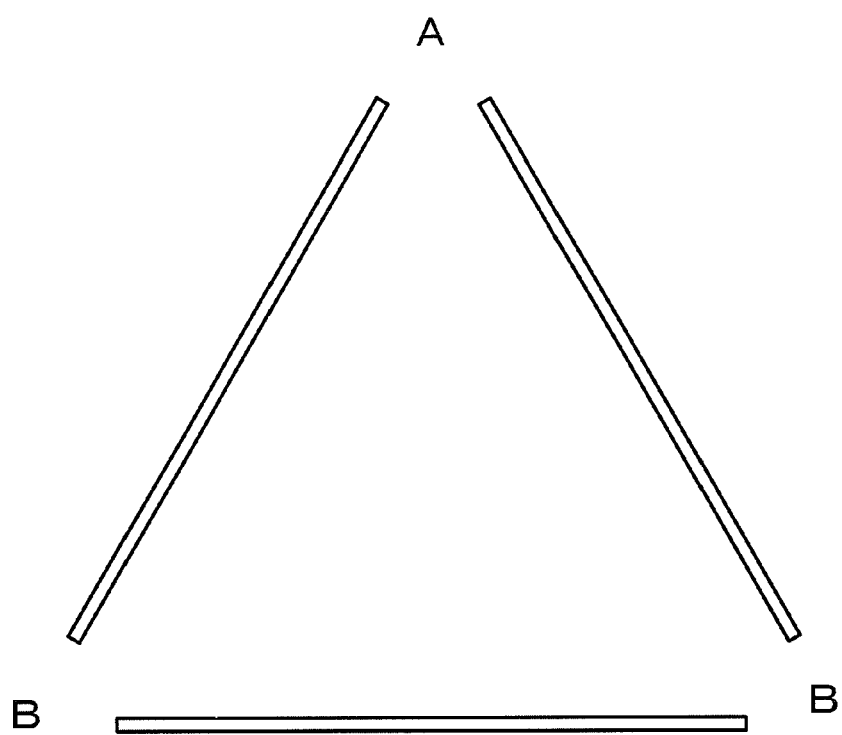
FIG. 15 is a schematic front view of the configuration of a light guide plate to measure brightness.

Another example of a result of brightness measurement showing the unevenness of brightness on a light guide plate is shown. FIG. 15 is a front view of the light guide plate, for which the brightness was measured. The light guide plate used in this measurement has a substantially triangular shape, and has diffusion dots on the entire front face, and diffusion ditches are formed at portions A and B, which are areas in the vicinity of respective apexes.

Figure 16:
FIGS. 16(A)-16(B) are partial enlarged views of an area in the vicinity of each apex of a light guide plate.
Figure 16:
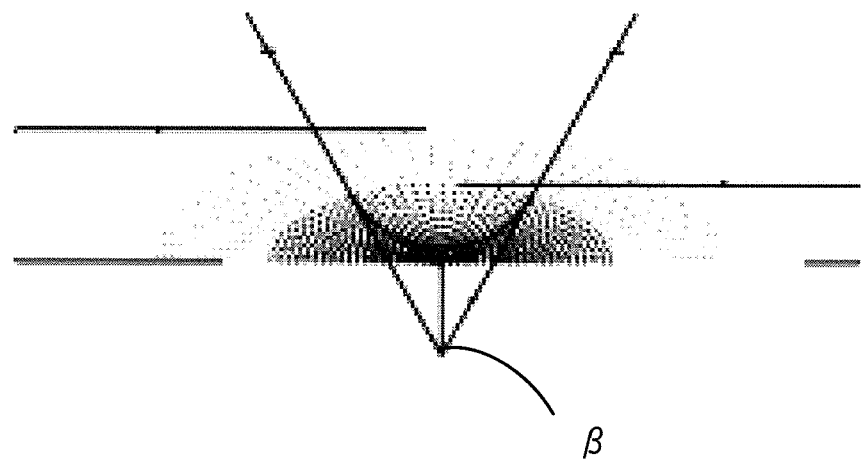

As shown in FIG. 16(A), portion A has: first diffusion ditches, each ditch consisting of dots each having a length of 1.0 mm and a width of 0.5 mm and spaced 4.0 mm apart from one another, and radially extends about intersection α of the extensions of adjacent linear sections to a distance of 115.0 mm, and is spaced 10° apart from one another; and second diffusion ditches, each ditch consisting of dots each having a length of 2.0 mm and a width of 0.5 mm and spaced 4.0 mm apart from one another, and radially extends about intersection α to a distance of 69.0 mm between adjacent first diffusion ditches.

As shown in FIG. 16(B), portion B has: first diffusion ditches, each ditch consisting of dots each having a length of 1.0 mm and a width of 0.5 mm and spaced 4.0 mm apart from one another, and radially extends about intersection α of the extensions of adjacent linear sections to a distance of 93.0 mm, and is spaced 10° apart from one another; and second diffusion ditches, each ditch consisting of dots each having a length of 2.0 mm and a width of 0.5 mm and spaced 4.0 mm apart from one another, and radially extends about intersection α to a distance of 55.0 mm between adjacent first diffusion ditches.

Next, referring to FIG. 15, the positioning of light sources is described. A plurality of surface-luminescence-type white LEDs were used for the light sources, and these light sources were placed at positions schematically shown as rectangles in FIG. 15. As is clear from FIG. 15, the light sources are placed on the right and left side faces of the light guide plate, and no light source is placed at any area in the vicinity of each apex of the light guide plate in FIG. 15. On this condition, the LEDs were lighted, and the brightness of each part of the light guide plate was measured.

Comparative Example 2

A light guide plate similar to that of Example 2 except that the first diffusion ditches and the second diffusion ditches are not formed at portions A or B is used, and it was measured under the same conditions as that of Example 1.

Figure 17:
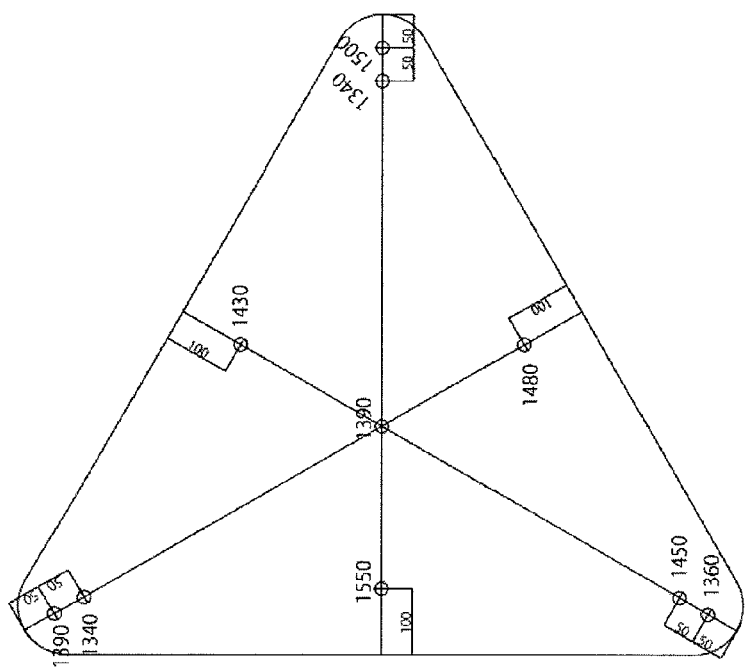
FIGS. 17(A)-(B) are explanatory diagrams of the brightness of each portion of light guide plates.
Figure 17:
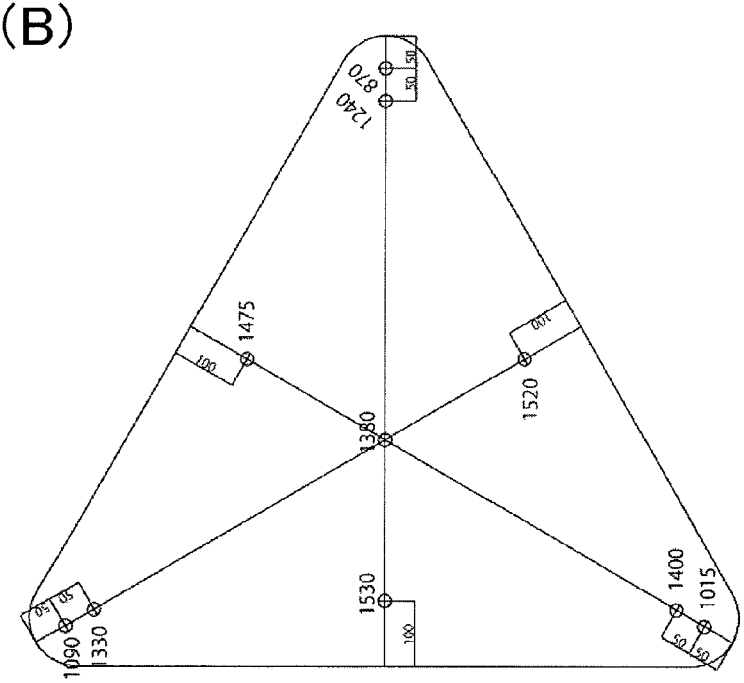
Figure 18:
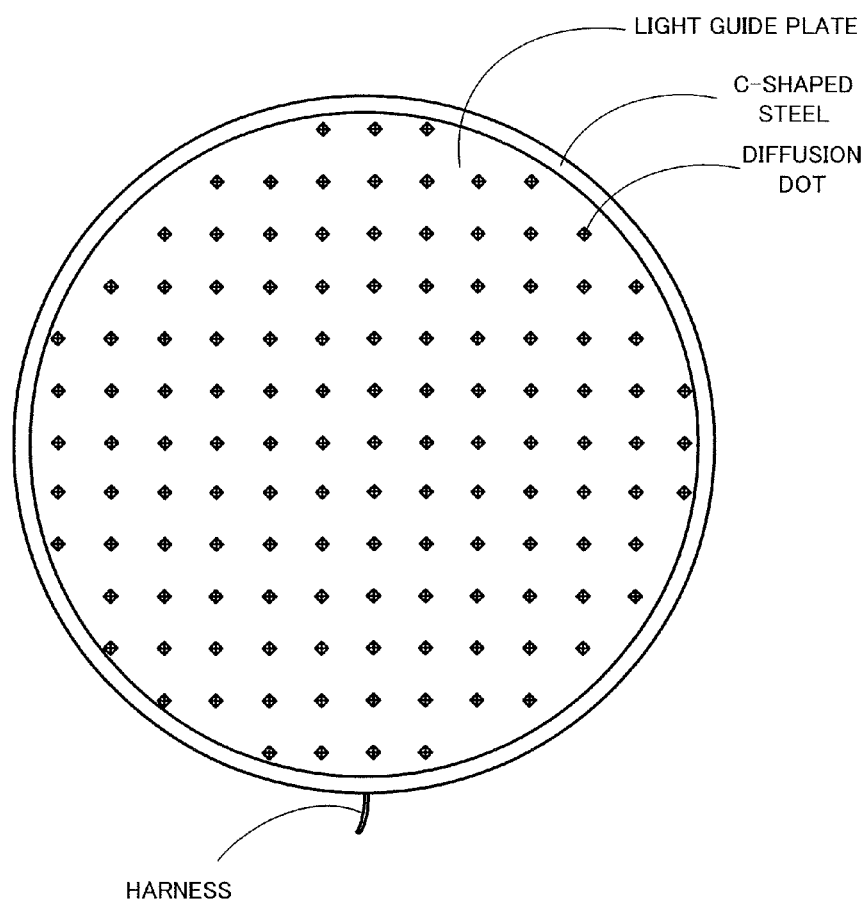
FIG. 18 is a front view of an example of a conventional light guide plate.

The comparative results of illuminance of each portion of the light guide plate in Example 2 and Comparative Example 2 is shown in FIGS. 17(A)-17(B). Here, FIGS. 17(A)-17(B) are the comparative results of illuminance of Example 2 and Comparative Example 2, and FIG. 17(A) shows the result of Example 2 and FIG. 17(B) shows the result of Comparative Example 2. Note that the unit of values in the figures is lux. As a result, in Example 2, the obtained result was that an area in the vicinity of the center of the light guide plate was approximately 1390 lux, while an area in the vicinity of each apex was approximately 1340-1500 lux, and the area in the vicinity of each apex was bright even though no LED was placed a corresponding curved section. It is obvious that this result shows that the formation of the first diffusion ditches and second diffusion ditches raises brightness, as compared with the result of Comparative Example 2 where the central area was 1380 lux while the area in the vicinity of each apex was 900-1000 and the area in the vicinity of each apex was dark.

The above results show that the formation of the first diffusion ditches and second diffusion ditches makes each portion brighter, and reduces the unevenness of brightness across the entire light guide plate.

INDUSTRIAL APPLICABILITY

As shown in the above described embodiments, the present invention can be applicable in the field of illumination, specifically, to light guide plates for illumination and light devices using these light guide plates.

DESCRIPTION OF REFERENCE SIGNS 10, 110, 210: Traffic sign
12: Display film
14: Supporting pole
20: Display unit
22: Reflection plate
24: Milky-white plate
28: Reflection seal
30, 130, 230, 330: Light guide plate
30a: Curved section
30b: Linear section,
31a: First diffusion region
31b: Second diffusion region
31c: Third diffusion region
32: Diffusion dots
32a: First diffusion dots
32b: Second diffusion dots
32c: Third diffusion dots
50, 250: Light source unit
52: Substrate
54: White-light-emitting-type LED 60: Ultrasonic processing horn
62: Processing dots
111, 211: Fixture
112, 212: Display board
113a, 115a, 213a, 215a: Bolt
113b, 115b, 213b, 215b: Waterproof washer
114, 214: Body frame
116, 216: Side frame
117, 217: Buffer member
118, 218: Back plate
120: Fixing member
120a: Upper face
120b: Lower face
122: Light source fixing member
132: First diffusion ditch
134: Second diffusion ditch
136: Diffusion ditch

The invention claimed is:

1. A display unit, comprising: a light guide plate for guiding light entered from a side face thereof, toward a main face thereof,
wherein the main face has a first diffusion region and a second diffusion region, and has a shape surrounded by at least three linear sections, and curved sections each interconnecting adjacent linear sections,
the first diffusion region is a region having a plurality of first diffusion elements for diffusing the light entered from the side face, towards the main face,
the second diffusion region is a region located between the first diffusion region and the corresponding curved section, and has a plurality of second diffusion elements for diffusing the light entered from the side face, towards the main face,
the ratio of the area of the plurality of first diffusion elements within the first diffusion region is smaller than the ratio of the area of the plurality of second diffusion elements within the second diffusion region, and
a plurality of LEDs are positioned at an outerface of the two linear adjacent the curved sections, for emitting light toward the side face of the two linear sections, and
wherein the LEDs are not positioned at an outer face of the curved sections.

2. The display unit according to claim 1, wherein the first diffusion elements and the second diffusion elements are diffusion dots.

3. The display unit according to claim 1,
wherein the first diffusion elements are diffusion dots, and the second diffusion elements are diffusion dots and first diffusion ditches.

4. The display unit according to claim 3, wherein each first diffusion ditch is provided as a continuous dotted line.

5. The display unit according to claim 3, wherein the first diffusion ditches are formed radially from the curved section side.

6. The display unit according to claim 3, wherein the second diffusion region is a region including a region surrounded by the corresponding curved section and an imaginary arc having a center that is an intersection point of the extension lines of adjacent linear sections.

7. The display unit according to claim 1, wherein the second diffusion region includes a third diffusion region at the corresponding curved section side thereof, wherein the third diffusion region has second diffusion ditches for diffusing the light emitted from the side face, towards the main face.

8. The display unit according to claim 7, wherein the second diffusion region is a region where the first diffusion ditches and the second diffusion ditches are arranged alternately one by one.

9. The display unit according to claim 7, wherein the third diffusion region has a shape similar to the second diffusion region.

10. The display unit according to claim 7, wherein the main face has a triangle, quadrangle, pentagon or hexagon shape.

11. The display unit according to claim 1,
wherein the main face of the light guide plate has a pentagon shape,
a plurality of the LEDs are positioned at the outer side of four linear sections of five linear sections defining the pentagon shape, and
the light guide plate is provided such that a linear section without having a plurality of the LEDs at the outer side thereof forms the upper side.

12. The display unit according to claim 1 further comprising:
a reflection member positioned at a curved face of the curved section, and the reflection member reflecting light guided toward the curved face of the curved section.

13. The display unit according to claim 1 further comprising:
a reflection plate adjacent to one side of the main face where the diffusion dots are provided, wherein the reflection plate reflects light emitted from the main face; and
a milky-white plate adjacent to the other side of the main face where the diffusion dots are not provided, wherein the milky-white plate displays a given information.

14. A traffic sign comprising: the display unit according to claim 1, and
a display section for displaying display information including letters, signs, figures, or any combination thereof.

15. A method of manufacturing the traffic sign of claim 14, comprising: a light guide plate guiding light entered from the side face toward the main face thereof; a display film provided on the surface of the main face, wherein the display film displays display information including letters, signs, figures, or any combination thereof; and a plurality of LEDs positioned at the outer side of the two linear sections adjacent the curved section, not positioned at the outer side of the curved section, and emitting light into the side face of the two linear sections, comprising:
(a) a diffusion dot forming step forming a plurality of the diffusion dots on the main face, wherein a plurality of the diffusion dots have a shape, to which the processing dot is reflected, by pushing processing dots provided on the face of the distal end of the ultrasonic processing horn; and
(b) after the diffusion dot processing step, a diffusion ditch forming step forming the second diffusion elements within the second diffusion region using a laser processing machine; and
(c) an assembling step positioning the LEDs on the side face of the a linear sections,
thereby the traffic sign, in which the brightness difference is entirely reduced is manufactured.

* * * * *